US011502893B1

(12) United States Patent
Newman et al.

(10) Patent No.: US 11,502,893 B1
(45) Date of Patent: Nov. 15, 2022

(54) SHORT-FORM 5G/6G PULSE-AMPLITUDE DEMODULATION REFERENCES

(71) Applicants: David E. Newman, Palos Verdes, CA (US); R. Kemp Massengill, Palos Verdes, CA (US)

(72) Inventors: David E. Newman, Palos Verdes, CA (US); R. Kemp Massengill, Palos Verdes, CA (US)

(73) Assignee: ULTRALOGIC 6G, LLC, Palos Verdes Estates, CA (US)

( * ) Notice: Subject to any disclaimer, the term of this patent is extended or adjusted under 35 U.S.C. 154(b) by 0 days.

(21) Appl. No.: 17/685,655

(22) Filed: Mar. 3, 2022

Related U.S. Application Data

(60) Provisional application No. 63/313,380, filed on Feb. 24, 2022, provisional application No. 63/272,352, filed on Oct. 27, 2021, provisional application No. 63/234,911, filed on Aug. 19, 2021, provisional application No. 63/220,669, filed on Jul. 12, 2021, provisional application No. 63/214,489, filed on Jun. 24, 2021, provisional application No. 63/210,216, filed on Jun. 14, 2021.

(51) Int. Cl.
*H04L 27/38* (2006.01)
*H04L 27/34* (2006.01)
*H04L 5/00* (2006.01)

(52) U.S. Cl.
CPC ........ *H04L 27/3863* (2013.01); *H04L 5/0048* (2013.01); *H04L 27/345* (2013.01)

(58) Field of Classification Search
CPC ....... H04L 27/02; H04L 27/06; H04L 27/345; H04L 27/38; H04L 27/3809; H04L 27/3863; H04L 5/04; H04L 5/0048
See application file for complete search history.

(56) References Cited

U.S. PATENT DOCUMENTS

| | | | |
|---|---|---|---|
| 5,521,941 A * | 5/1996 | Wiatrowski | .......... H04L 25/066 307/73 |
| 10,090,980 B2 | 10/2018 | Nammi | |
| 10,419,181 B2 | 9/2019 | Xia | |
| 10,708,900 B2 | 7/2020 | Popovic | |
| 10,833,823 B2 | 11/2020 | Nammi | |
| 10,880,164 B2 | 12/2020 | Ghosh | |

(Continued)

*Primary Examiner* — Siu M Lee
(74) *Attorney, Agent, or Firm* — Mayer & Williams PC

(57) ABSTRACT

Short-form pulse-amplitude demodulation references disclosed herein may enable low-cost receivers to demodulate wireless messages while avoiding complex 5G and 6G protocols, thereby enabling a multitude of cost-constrained applications. Despite their small footprint, the short-form pulse-amplitude demodulation references enable the receiver to determine all of the amplitude levels of the modulation scheme, including the effects of noise and interference. Mitigation of noise and interference can therefore be provided by embedding short-form pulse-amplitude demodulation references within longer messages, thereby providing an immediate refresh of the modulation calibrations, enhancing communication reliability, and avoiding costly message faults despite high background interference. Short-form pulse-amplitude demodulation references disclosed herein can be used as a default standard demodulation reference in 5G and 6G wireless messages.

20 Claims, 10 Drawing Sheets

(56) References Cited

U.S. PATENT DOCUMENTS

| | | |
|---|---|---|
| 11,165,606 B2 | 11/2021 | Liu |
| 11,418,372 B1* | 8/2022 | Newman ................. H04L 27/06 |
| 2004/0114692 A1* | 6/2004 | Matsumoto ......... H04L 27/3809 |
| | | 375/264 |
| 2005/0052227 A1* | 3/2005 | Korner .................... H04L 27/14 |
| | | 455/323 |
| 2009/0247100 A1* | 10/2009 | Meltzer ................... H03D 1/06 |
| | | 455/313 |
| 2012/0106473 A1 | 5/2012 | Tiirola |
| 2015/0282124 A1 | 10/2015 | Miao |
| 2016/0119901 A1 | 4/2016 | Zhang |
| 2017/0230156 A1 | 8/2017 | Fakoorian |
| 2018/0242307 A1 | 8/2018 | Chen |
| 2019/0200326 A1 | 6/2019 | Shin |
| 2020/0145869 A1 | 5/2020 | Nammi |
| 2020/0259693 A1 | 8/2020 | Baldemair |
| 2020/0313818 A1 | 10/2020 | Wu |
| 2021/0022117 A1 | 1/2021 | Yi |
| 2021/0045160 A1 | 2/2021 | Irukulapati |
| 2021/0105117 A1 | 4/2021 | Abdelghaffar |

* cited by examiner

SHORT-FORM 5G/6G PULSE-AMPLITUDE DEMODULATION REFERENCES

PRIORITY CLAIMS AND RELATED APPLICATIONS

This application claims the benefit of U.S. Provisional Patent Application Ser. No. 63/210,216, entitled "Low-Complexity Access and Machine-Type Communication in 5G", filed Jun. 14, 2021, and U.S. Provisional Patent Application Ser. No. 63/214,489, entitled "Low-Complexity Access and Machine-Type Communication in 5G", filed Jun. 24, 2021, and U.S. Provisional Patent Application Ser. No. 63/220,669, entitled "Low-Complexity Access and Machine-Type Communication in 5G", filed Jul. 12, 2021, and U.S. Provisional Patent Application Ser. No. 63/234,911, entitled "Short Demodulation Reference for Improved Reception in 5G", filed Aug. 19, 2021, and U.S. Provisional Patent Application Ser. No. 63/272,352, entitled "Sidelink V2V, V2X, and Low-Complexity IoT Communications in 5G and 6G", filed Oct. 27, 2021, and U.S. Provisional Patent Application Ser. No. 63/313,380, entitled "Short-Form 5G/6G Pulse-Amplitude Demodulation References", filed Feb. 24, 2022, all of which are hereby incorporated by reference in their entireties.

FIELD OF THE INVENTION

Disclosed are short-form demodulation references and demodulation procedures for pulse-amplitude modulation, low-complexity devices, and noise/interference mitigation in a high-density 5G/6G wireless network.

BACKGROUND OF THE INVENTION

A demodulation reference is a message or message portion that exhibits certain modulation levels of a modulation scheme. Demodulation references thereby assist the receiving entity in demodulating a subsequent message. In 5G and 6G, communications may be modulated according to PAM (pulse-amplitude modulation) in which the binary bits of a message are divided between two parallel signals or "branches". The two branches (termed I and Q) are amplitude-modulated according to the message bits, and then summed with a 90-degree phase offset before transmitting. The primary demodulation reference is a DMRS (demodulation reference signal) which is configured according to one of a number of pseudorandom sequences according to a complex formula. However, some user devices may have difficulty processing such 5G and 6G requirements, or accommodating the bulky DMRS in their reception. In addition, the fluctuating interference background in high-density wireless environments, such as a dense urban area or an automated factory environment, may cause demodulation faults, resulting in missed calls, reduced reliability, and time-consuming retransmissions. What is needed is a demodulation reference configured for use by reduced-capability devices and high-performance users alike, suitable for messaging in both low-density and high-density wireless traffic environments.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for demodulating a wireless message, the message comprising message elements, each message element modulated according to a modulation scheme, the modulation scheme comprising integer Nlevel predetermined amplitude levels, Nlevel greater than or equal to two, the method comprising: receiving a demodulation reference comprising integer Nref reference elements, Nref less than or equal to four; extracting, from each reference element, an I-branch signal having an I-branch amplitude, and a Q-branch signal having a Q-branch amplitude, the I-branch signal phase-shifted relative to the Q-branch signal; determining, based at least in part on the Nref I-branch amplitudes and the Nref Q-branch amplitudes, the Nlevel predetermined amplitude levels of the modulation scheme; and demodulating each message element according to the predetermined amplitude levels.

In another aspect, there is non-transitory computer-readable media in a wireless receiver, the media containing instructions that when executed by a computing environment cause a method to be performed, the method comprising: receiving a demodulation reference comprising exactly one reference element modulated according to a modulation scheme, the modulation scheme comprising integer Nlevel amplitude levels, the amplitude levels including a minimum positive amplitude level and a maximum positive amplitude level, wherein a predetermined amplitude ratio equals the maximum positive amplitude level divided by the minimum positive amplitude level; extracting, from the reference element, a first branch signal having a first branch amplitude, and a second branch signal having a second branch amplitude, the second branch signal phase-shifted relative to the first branch signal; and setting the maximum positive amplitude level equal to the first branch amplitude and the minimum positive amplitude level equal to the second branch amplitude.

In another aspect, there is a wireless communication device configured to: receive a demodulation reference modulated according to a modulation scheme, the modulation scheme comprising integer Nlevel predetermined amplitude levels, the demodulation reference comprising exactly two reference resource elements, each reference resource element comprising a first branch signal and a second branch signal phase-shifted relative to the first branch signal; determine four reference amplitude values according to the first and second branch signals of the two reference resource elements, respectively; and determine the Nlevel amplitude levels according to the four reference amplitude values.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

Figure 1A:
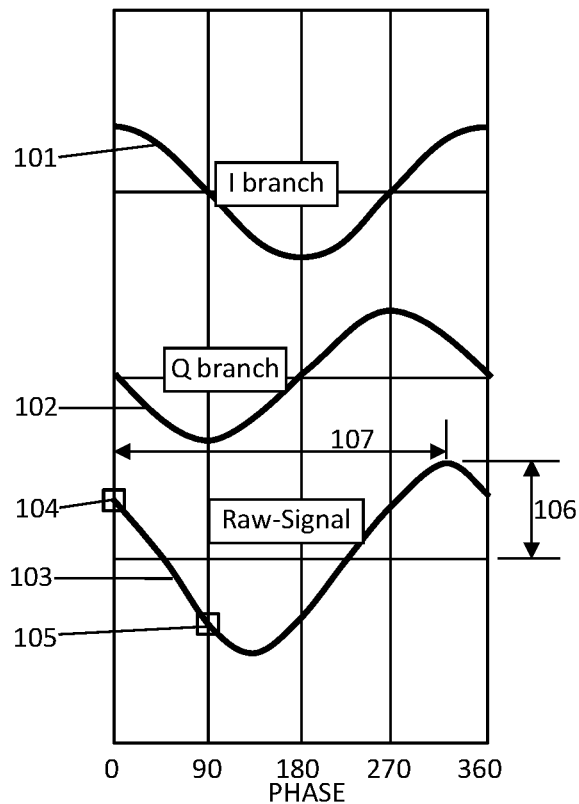
FIG. 1A is a schematic showing an exemplary embodiment of a wave modulated using pulse-amplitude modulation, according to some embodiments.

DETAILED DESCRIPTION 5G and 6G technologies are designed for eMBB (enhanced Mobile Broadband communications), URLLC (ultra reliable low latency communications), and mMTC (massive machine-type communication) generally involving large numbers of user devices such as vehicles, mobile phones, self-propelled and robotic machines, portable and stationary computers, and many other advanced wireless instruments. However, many future IoT (internet of things) use cases are expected to involve simple, low-cost, reduced-capability MTC (machine-type communication) wireless devices. For example, a temperature sensor or a door alarm or a timer, among innumerable other task-based wireless products, may include a low-cost processor such as a small microcontroller or an ASIC (application-specific integrated circuit) and may have minimal wireless communication needs. Future automated factories are expected to use large numbers of such single-purpose wireless devices in a high-density communication environment. Reduced-capability processors may have difficulty performing complex 5G/6G procedures, which were developed for highly competent devices that require high-performance communication services. Because both high-performance and reduced-capability devices share the same, limited electromagnetic spectrum, it would be tragic if the simpler machine-type applications are forced to develop a separate wireless technology, competing with 5G and 6G for bandwidth and locations. A much more efficient solution is to include, in 5G and 6G, a set of simpler protocols and defaults appropriate for the low-cost, low-demand MTC devices. Experience with 4G has shown that incorporating such flexibility into an already established radio-communication technology is difficult. Therefore, if 5G and 6G are to make accommodation for reduced-capability systems in IoT applications, appropriate procedures and options should be incorporated as early in the development as possible.

A related problem pertains to interference in high-density wireless environments where thousands or millions of devices are in radio range of each other, such as an urban center or a highly automated manufacturing center. Background interference from the sea of electromagnetic signaling may cause frequent modulation distortions in each message, degrading reliability, causing message faults, interruptions, delays, and missed calls, leading to severely limited network throughput. Moreover, the retransmissions resulting from such faults will contribute further to the overall background, making the underlying problem even worse. Interference is intrinsically bursty and frequency-rich, that is, fluctuating rapidly in both time and frequency. Demodulation references can mitigate the interference problem by updating the current amplitude and phase modulation levels to compensate for the current interference effects, and may thereby assist in demodulating a subsequent message accurately despite interference. Systems and methods disclosed herein (the "systems" and "methods", also occasionally termed "embodiments" or "arrangements", generally according to present principles) can provide urgently needed wireless communication protocols to reduce messaging complexity and delays, facilitate low-complexity demodulation, enable more frequent demodulation calibration in noisy environments, and provide readily available options to accommodate reduced-capability user devices, according to some embodiments. The motivation behind the present disclosure is to provide a demodulation reference option, suitable for both high-performance and low-cost devices, in sparse rural as well as dense urban/industrial wireless environments.

Disclosed herein are short, low-complexity "PAM" (pulse-amplitude modulation) demodulation references, configured to provide enhanced modulation and demodulation in 5G and 6G networks. In PAM, each modulated message resource element is prepared by amplitude-modulating two sinusoidal signals separately, and then adding them together phase-shifted by 90-degrees. Each of the component signals may be called a "branch", such as the "I-branch" and "Q-branch" (I for in-phase, Q for quadrature-phase) or "real and imaginary", among other terms. The as-received signal is termed a "raw signal" herein. The raw signal is generally equal to the sum of the two branch signals. The raw signal may be demodulated by separating the branch signals according to phase, measuring the amplitude of each branch signal, and comparing the branch amplitudes to a predetermined set of amplitude levels including all of the branch amplitude levels of the modulation scheme. Such a set of predetermined amplitudes may be termed a "calibration set" herein. The predetermined amplitudes are generally provided by a demodulation reference before the message is transmitted. Pulse-amplitude modulation is in contrast to "classical" amplitude and phase modulation, in which each message element is amplitude modulated and separately (orthogonally) phase modulated. Classical modulation and PAM modulation provide distinct advantages and disadvantages regarding noise mitigation and error correction, as detailed below.

The systems and methods include a receiver configured to demodulate the raw signal in both ways, by (a) measuring the raw signal amplitude and phase, and comparing to a first calibration set that includes the predetermined raw signal amplitudes and phases of the states of the modulation scheme, and (b) separating the I-branch and Q-branch, and measuring each branch amplitude, then comparing those amplitude values to a second calibration set containing the predetermined branch amplitudes of the states of the modulation scheme. Although the branch signals are generally considered to be determined by the raw signal amplitude and phase, and vice-versa, numerous non-ideal effects can distort that association, particularly involving phase shifts. For example, the receiver may detect a faulted message element according to a deviation in the raw signal demodulation procedure which the I and Q branch demodulation procedure may miss, or vice-versa. In addition, the receiver may reveal an unexpected inconsistency between the two demodulation results, indicating a deeper error, among other problems that can be potentially revealed by one or the other procedure, or a comparison of the two demodulation results.

Terms herein generally follow 3GPP (third generation partnership project) standards, but with clarification where needed to resolve ambiguities. As used herein, "5G" represents fifth-generation, and "6G" sixth-generation, wireless technology in which a network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period", and a specific frequency and bandwidth termed a "subcarrier" (or "subchannel" in some references). Symbol periods may be termed "OFDM symbols" (Orthogonal Frequency-Division Multiplexing) in references. The time domain may be divided into ten-millisecond frames, one-millisecond subframes, and some number of slots, each slot including 14 symbol periods. The number of slots per subframe ranges from 1 to 8 depending on the "numerology" selected. The frequency axis is divided into "resource blocks" (also termed "resource element groups" or "REG" or "channels" in references) including 12 subcarriers. Each subcarrier is at a slightly different frequency. The "numerology" of a resource grid corresponds to the subcarrier spacing in the frequency domain. Subcarrier spacings of 15, 30, 60, 120, and 240 kHz are defined in various numerologies. Each subcarrier can be independently modulated to convey message information. Thus a resource element, spanning a single symbol period in time and a single subcarrier in frequency, is the smallest unit of a message. Standard modulation schemes in 5G and 6G include BPSK (binary phase-shift keying), QPSK (quad phase-shift keying), 16QAM (quadrature amplitude modulation with 16 modulation states), 64QAM, 256QAM and higher orders. Most of the examples below relate to QPSK or 16QAM, with straightforward extension to the other levels of modulation. For example, 16QAM modulated according to PAM exhibits two phase levels at zero and 90 degrees (or in practice, for carrier suppression, ±45 degrees) and four amplitude levels including two positive and two negative, thus forming 16 distinct modulation states. Communication in 5G and 6G generally takes place on abstract message "channels" (not to be confused with frequency channels) representing different types of messages, embodied as a PDCCH and PUCCH (physical downlink and uplink control channels) for transmitting control information, PDSCH and PUSCH (physical downlink and uplink shared channels) for transmitting data and other non-control information, PBCH (physical broadcast channel) for transmitting information to multiple user devices, among other channels that may be in use. In addition, one or more random access channels may include multiple random access channels in a single cell. "CRC" (cyclic redundancy code) is an error-checking code. "RNTI" (radio network temporary identity) is a network-assigned user code. "SNR" (signal-to-noise ratio) and "SINR" (signal-to-interference-and-noise ratio) are used interchangeably unless specifically indicated. "RRC" (radio resource control) is a control-type message from a base station to a user device.

In addition to the 3GPP terms, the following terms are defined herein. Although in references a modulated resource element of a message may be referred to as a "symbol", this may be confused with the same term for a time interval, among other things. Therefore, each modulated resource element of a message is referred to as a "modulated message resource element", or more simply as a "message element", in examples below. A "demodulation reference" is a set of Nref modulated "reference resource elements" that exhibit levels of a modulation scheme (as opposed to conveying data). Thus integer Nref is the number of reference resource elements in the demodulation reference. A "calibration set" is one or more amplitude values (and optionally phase values), which have been determined according to a demodulation reference, representing the predetermined amplitude levels of a modulation scheme. Generally the modulation scheme includes integer Nlevel predetermined amplitude levels, including the positive and negative values.

"PAM" (pulse-amplitude modulation, not to be confused with signal generation by rapid pulsatile energy bursts) is a message modulation technology in which bits of a message are allocated to two sinusoidal "branch" signals, which are amplitude-modulated to encode the message bits, and then summed with a 90-degree phase offset, and transmitted. (In contrast, "classical" amplitude-phase modulation includes amplitude modulation multiplexed with phase modulation of each message element.) A receiver can receive a PAM-transmitted raw signal, separate the two branch signals, and measure their amplitudes. The receiver can demodulate the message elements by separating the two branch signals, measuring their amplitudes, and comparing to a set of predetermined amplitude levels of the PAM modulation scheme. The branches may be termed the "real" and "imaginary" branches, or the "I and Q" (in-phase and quadrature-phase) branches, as mentioned. A "constellation table" is a chart showing the I and Q modulation states of a PAM modulation scheme. The "raw signal" is the as-received signal of a message element or a reference element, prior to separation of the branch signals. A receiver, upon receiving the raw signal, can separate the two branches and measure the amplitude of each branch. A "branch amplitude" is the amplitude of an I or Q branch signal, as determined by a receiver. In the context of branch amplitudes, a "maximum negative" amplitude is an amplitude with a negative sign and the largest magnitude of the modulation scheme, while the "minimum negative" amplitude is an amplitude with a negative sign and the smallest magnitude. Thus "maximum" and "minimum", in the context of amplitudes, refer to the magnitudes of the amplitude levels.

The receiver can demodulate a message element by extracting its I and Q branch signals, measuring their branch amplitudes, and comparing to the predetermined Nlevel amplitude levels of a calibration set. The predetermined modulation levels of the calibration set may be accumulated from the branch amplitudes of a preceding demodulation reference, plus additional levels calculated from the exhibited branch amplitudes by interpolation, or based on an amplitude ratio and/or other predetermined parameters. An "amplitude deviation" of a message element is the difference between its I or Q branch amplitude and the closest predetermined amplitude level in the calibration set. Accordingly, the "modulation quality" of a message element is a measure of how close the I and Q branch amplitudes are to the closest predetermined amplitude level of the modulation scheme, or equivalently how close the modulation of the message element is to the closest state of the modulation scheme, as indicated by amplitude levels in the calibration set. Thus the "closest state" of the modulation scheme to a particular message element is the state that has the closest predetermined amplitude levels to the I-branch and Q-branch amplitudes of the message element. Each state corresponds to a first predetermined amplitude level (closest to the message element's I-branch amplitude) and a second predetermined amplitude level (closest to the message element's Q-branch amplitude). The closest state to a particular message element is the state in which the difference between the first predetermined amplitude is closest to the message element's I-branch amplitude and the second predetermined amplitude is closest to the message element's Q-branch amplitude. The modulation quality may be calculated by adding those differences in magnitude, or the square root of the sum of the squares of the differences, or other formula relating the deviation of the message element's amplitudes from the modulation state's amplitudes.

Each of the I-branch and Q-branch signals may be amplitude modulated according to one of the Nlevel predetermined amplitude levels. For example, 16QAM has two predetermined positive amplitude levels, such as +1 and +3 (in some units), and two predetermined negative amplitude levels, such as −1 and −3. Thus each I or Q branch can then be amplitude modulated as −3, −1, +1, or +3, thereby representing four possible branch amplitude values. Each message element includes two branches (I and Q), each of which has four branch amplitude possibilities, thereby providing 4×4=16 total modulation states, as expected for 16QAM. The modulation scheme may be characterized by an "amplitude ratio" equal to the maximum branch amplitude level divided by the minimum branch amplitude level of the modulation scheme. The same amplitude ratio also applies to the branch amplitudes and the raw signal amplitudes. In 16QAM, the amplitude ratio is 3. This provides that the branch amplitudes are uniformly spaced, that is, the branch amplitude levels are separated by 2 units in the current example (−3, −1, +1, +3).

For 64QAM, there are 8 branch amplitude levels (−7, −5, −3, −1, +1, +3, +5, +7 in some units) and hence the amplitude ratio is 7 (maximum positive level divided by minimum positive level, or 7 divided by 1). In 256QAM, the amplitude ratio is 15. In general, the amplitude ratio in PAM equals the square root of the number of modulation states, minus one. The amplitude of the raw signal itself is determined by the trigonometric sum of the two branch signals, accounting for their phase difference. For example, the raw signal amplitude levels for 16QAM are, to sufficient accuracy, 1.414, 3.165, and 4.243 in the same units as the branch amplitudes mentioned above. These three amplitude levels correspond to the sum of I and Q branch signals at the minimum (+1) branch amplitude, the sum of a minimum and a maximum (+1 and +3), and the sum of two maximum branch amplitude signals (+3), respectively.

"Low-complexity" refers to devices and procedures necessary for wireless communication, exclusive of devices and procedures that provide high-performance communication. 5G/6G specifications include many procedures and requirements that greatly exceed those necessary for wireless communication, in order to provide high-performance communications at low latency and high reliability for users that demand it. Compared to scheduled and managed 5G/6G messaging, low-complexity procedures generally require less computation and less signal processing. For example, low-complexity procedures may be tailored to minimize the number of separate operations required of a device per unit of time. 5G and 6G specifications include a very wide range of options and contingencies and versions and formats and types and modes for many operations, to achieve maximum flexibility. A low-complexity specification may include defaults for each operation, and those defaults may be the simplest choices, or at least simpler than standard 5G and 6G procedures. "Simpler" procedures generally require fewer computation steps and/or smaller memory spaces than corresponding procedures in standard 5G/6G. Computation steps may be measured in floating-point calculations, for example.

"Reduced-capability" refers to wireless devices that cannot comply with 5G or 6G protocols, absent the systems and methods disclosed herein. For example, regular 5G and 6G user devices are required to receive a 5 MHz bandwidth in order to receive system information messages. Regular user devices are required to perform high-speed signal processing such as digitizing the received waveform, applying digital filtering or Fourier transforming an incoming waveform, phase-dependent integrating at several GHz frequency, and separating closely-spaced subcarriers. A reduced-capability device, on the other hand, may not need the high performance gained by such procedures, and may be incapable of performing them. A reduced-capability device may be able to receive a narrow-band wireless signal, demodulate the message, and interpret the content without further processing.

"High-density" wireless communication refers to cells where the number of active transmitters per unit area challenges the ability of the network to manage the traffic without degraded service. For example, in a built-up urban environment, a city block of 100×200 m$^2$ with 10-storey apartment buildings, 100 m$^2$ per apartment at double occupancy, and conservatively assuming 5 wireless devices per person (phones, watches, fitness bands, and whatnot) plus 10 wireless devices per apartment (computers, smart appliances, doorbell cameras, temperature sensors, dog collars, etc.), almost all of them being always-on devices, the active device density is then 40,000 devices per city block or about 2 devices per square meter. The road space between blocks scarcely reduces this load because it is typically filled with heavily-linked vehicles, traffic signals, wireless advertising signs, smart trash cans, and whatever future inventors can devise. Basic physics says with confidence that the electromagnetic background will be significant and fluctuating.

For economic reasons as well as commercial feasibility, future IoT application developers will demand ways to transmit messages using bandwidths and protocols appropriate to the simpler devices. It is important to provide such low-complexity options early in the 6G roll-out, while such flexibility can still be incorporated in the system design. Accordingly, the systems and methods disclosed herein include "short-form pulse-amplitude demodulation references", or "SF-PA demodulation references". These are low-complexity PAM-compatible demodulation references suitable for reduced-capability user devices as well as high-performance devices. In some embodiments, the low-complexity short-form pulse-amplitude demodulation references may be short messages, such as 1 or 2 or 3 or 4 resource elements in length, and thus may be termed "short-form" due to their reduced size relative to the demodulation references of prior art. They are PAM-compatible in that each message element of a message can be demodulated by measuring its I and Q amplitude values and comparing to the Nlevel predetermined amplitude levels in a calibration set, obtained from a preceding short-form pulse-amplitude demodulation reference.

In some embodiments, a short-form pulse-amplitude demodulation reference may explicitly show just a subset of the Nlevel branch amplitude levels of the pulse-amplitude modulation scheme, yet may provide sufficient information that a receiver can calculate the remaining modulation levels and thereby demodulate a subsequent message. In particular, assuming the same noise and interference apply to the demodulation reference, the subsequent message demodulation may largely cancel the noise and interference effects. If a base station supports a low-complexity channel to accommodate the lowered communication needs of simpler wireless devices, the short-form pulse-amplitude demodulation references disclosed herein may be readily incorporated as the default demodulation reference for communications in that channel. In addition, the high-performance scheduled and managed channels of 5G/6G may beneficially employ short-form pulse-amplitude demodulation references for reduced latency, higher throughput, and improved interference rejection in noisy environments, due to the reduced size and complexity of the short-form pulse-amplitude demodulation references. In addition, improved SNR may be obtained by analyzing each message element's modulation using both PAM and classical amplitude-phase technologies, as described below.

Numerous formats of the short-form PAM demodulation reference are envisioned and disclosed. Due to the many possible versions listed and envisioned, it would be helpful for a wireless standards committee to declare one of the short-form pulse-amplitude demodulation versions to be a default standard.

Turning now to the figures, in a first example, the branches of a PAM-modulated message element are compared to a classical amplitude-phase modulated message element.

FIG. 1A is a schematic showing an exemplary embodiment of a wave modulated using pulse-amplitude modulation, according to some embodiments. As depicted in this non-limiting example, waves representing modulated signals are shown as in an oscilloscope display, with voltage vertical and time horizontal. A first wave 101 represents the real or "I" branch, phased at zero degrees with a particular amplitude as shown. The second wave 102 is the imaginary or "Q" branch, phased at 90 degrees, and has a negative amplitude in this case. The third wave 103 ("raw signal") is the sum of the first and second waves 101 and 102, representing the transmitted or received waveform. A receiver, upon detecting the raw signal wave 103, can demodulate it by measuring the zero-degree I amplitude, indicated as a square 104 at zero degrees, and the 90-degree Q amplitude 105. These values 104, 105 are the "branch amplitudes". In the absence of noise or interference, the Q signal is zero at the instant (or phase) when the I branch is measured, and the I signal is zero when the Q branch is measured. Hence each phased measurement detects only one of the branches at a time, in principle. The receiver can then determine the modulation state according to the signs and ratios of those branch amplitude values. For example, a particular modulation scheme may have four amplitude values, termed a maximum positive amplitude, the minimum positive amplitude, the minimum negative amplitude, and the maximum negative amplitude. Hence there are four possible values for the I branch, and another four for the Q branch. The receiver generally assumes that the two branches have the same predetermined amplitude levels, absent phase-dependent interference. The raw wave 103 is the sum of an I signal and a Q signal, and each can have four values. Hence, there are 16 possible states, and the modulation scheme is 16QAM.

In some embodiments, the receiver can measure the amplitude and phase of the as-received raw signal 103 in addition to the I and Q branch amplitudes. The amplitude of the raw signal 103 is shown as 106, and the phase (measured to the positive peak) is shown as 107. Although the raw signal amplitude and phase are deterministically related to the I and Q branch amplitudes, the receiver can acquire additional information about noise and interference effects, as well as timing errors, by measuring the branch amplitudes and the raw signal properties, and comparing them to a calibration set or to the branch amplitudes, seeking inconsistencies or low modulation quality. In addition, depending on the measurement uncertainties, the receiver can detect distortions in the phase and amplitude of the as-received wave more readily than in the branch amplitudes, or vice-versa. The receiver can compare the raw signal phase and amplitude data with the branch amplitude data to reveal otherwise undetected or subtle noise and interference effects, and may thereby identify which message elements are at fault in a corrupted message. After identifying one or more "suspicious" or inconsistent or poor-modulation message elements, the receiver may attempt to correct the message by altering the faulted message elements. If the number of suspicious message elements is small, the alteration search may take less time than requesting a retransmission.

Figure 1B:
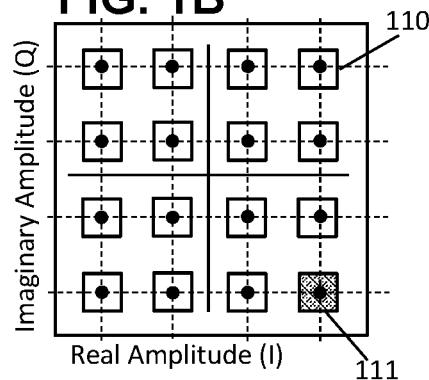
FIG. 1B is a constellation table showing an exemplary embodiment of a pulse-amplitude demodulation scheme based on real and imaginary components, according to some embodiments.

FIG. 1B is a "constellation chart" showing an exemplary embodiment of a demodulation scheme based on real and imaginary components, according to some embodiments. As depicted in this non-limiting example, a constellation chart is an array showing all of the PAM modulation states, plotted with the amplitude of the I branch horizontally and the amplitude of the Q branch vertically. Thus the constellation chart shows all valid combinations of the I and Q branch amplitudes in the modulation scheme. The central cross shape on the chart divides the positive and negative amplitude values. Each modulation state is shown as a square 110 indicating the amplitudes of the I and Q branches. In this case, the modulation scheme is 16QAM with 16 states. One of the modulation states is stippled 111, representing a maximally positive I amplitude and a maximally negative Q amplitude. Hence, the state 111 corresponds to the raw signal wave 103 of the previous figure.

Figure 1C:
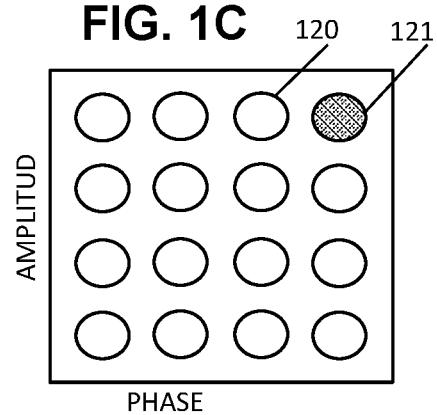
FIG. 1C is a modulation table showing an exemplary embodiment of a classical modulation scheme based on multiplexed amplitude and phase modulation, according to some embodiments.

FIG. 1C is a "modulation table" showing an exemplary embodiment of a demodulation scheme based on classical amplitude and phase modulation, according to some embodiments. As depicted in this non-limiting example, the modulation table shows all of the valid modulation states of the modulation scheme, plotted with the raw signal phase horizontally and the raw signal amplitude vertically. All amplitude and phase levels are positive. There are four amplitude levels and four phase levels in this case, corresponding to 16QAM. Each valid state of the modulation scheme is shown as a circle 120. A particular state 121 has the maximum phase and the maximum amplitude of the raw signal wave. Hence the state 121 corresponds to the raw signal wave 103 of FIG. 1A and also to the constellation state 111 of FIG. 1B.

Figure 1D:
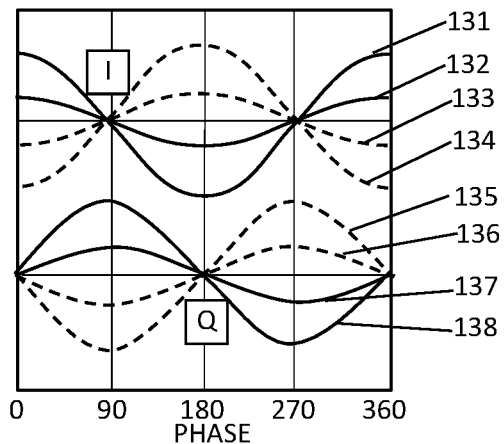
FIG. 1D is a sketch showing an exemplary embodiment of the in-phase and quadrature-phase waves of a pulse-amplitude modulation scheme, according to some embodiments.

FIG. 1D is a chart showing an exemplary embodiment of I and Q branch waveforms of a PAM modulation scheme, according to some embodiments. As depicted in this non-limiting example, the wave shapes are shown versus phase (or equivalently, versus time) with four exemplary I waves at the top and four exemplary Q waves at the bottom of the chart. Each wave can have a maximum or minimum branch amplitude, and can have positive or negative sign, and can be phased at zero or 90 degrees (as the I or Q branches), hence forming eight different waves as shown. The I branch waves 131-134 and the Q-branch waves 135-138 form the components of the modulation scheme. Wave 131 has the maximum branch amplitude and a positive sign, while wave 132 has the minimum branch amplitude and a positive sign. Waves 133 and 134 have a negative sign (shown dashed) and have the minimum and maximum branch amplitudes, respectively. Likewise waves 135-138 are on the Q branch with 135 and 136 having positive max and min branch amplitudes, while 137 and 138 have the negative min and max branch amplitudes.

The modulation state is determined by the magnitude of the amplitude and the sign of the amplitude, measured at zero degrees for I and at 90 degrees for Q. The modulation scheme generally uses a small number Nlevel of predetermined branch amplitude levels. In this case, Nlevel equals four predetermined amplitude levels. The transmitter encodes the message data by constructing the states of the modulation scheme, by multiplexing the I and Q branches using only those predetermined amplitude levels. QPSK has two predetermined amplitude levels, thereby generating four states by combining the I and Q branches. 16QAM has four I and four Q branch amplitudes which, when multiplexed, provides 16 states. Higher order modulation schemes have additional levels. The predetermined amplitude levels are generally selected so that the branch waves are equally spaced, as suggested in the figure. For example, for 16QAM, the maximum may be 3 times the minimum amplitude, so that the spacing between the max and min positive waves equals the spacing between the min positive and min negative waves, which is equal to the spacing between the negative min and max waves, as shown. For higher-order modulation schemes, the branch amplitudes may be selected so as to preserve the uniform spacing.

Figure 1E:
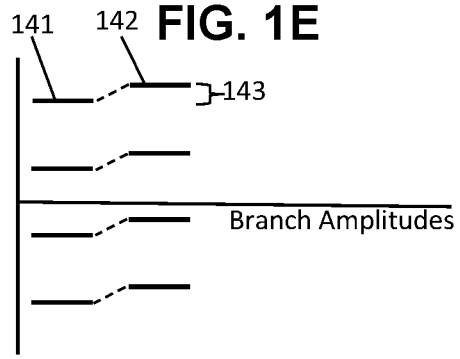
FIG. 1E is a sketch showing an exemplary embodiment of the branch amplitudes of a pulse-amplitude modulation scheme, according to some embodiments.

FIG. 1E is a sketch showing an exemplary embodiment of the branch amplitudes of a pulse-amplitude modulation scheme, according to some embodiments. As depicted in this non-limiting example, the four positive and negative branch amplitudes 141 of a PAM modulation scheme for 16QAM are shown for the zero-noise case on the left, and with additive noise on the right. The four predetermined branch amplitudes 141 include the maximum positive amplitude, the minimum positive amplitude, the minimum negative amplitude, and the maximum negative amplitude levels, equally spaced, which correspond to the waves 131, 132, 133, 134 of the previous figure. The I and Q branches are generally assumed to have the same branch amplitudes, absent phase-dependent interference.

Also shown are the branch amplitudes with additive noise 142. The noise shift is shown as 143, and is assumed the same for all branch amplitudes, that is, additive noise. By measuring the branch amplitudes of a demodulation reference, and then using those values to demodulate a subsequent message, the receiver can mitigate additive noise and interference, in some embodiments.

Figure 1F:
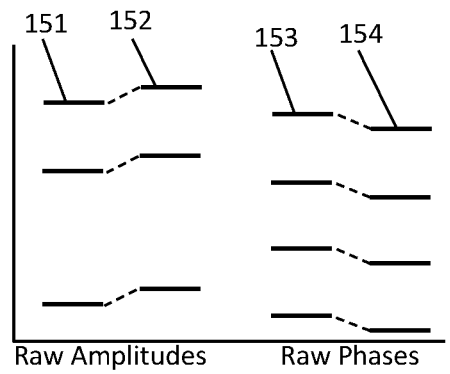
FIG. 1F is a sketch showing an exemplary embodiment of the raw signal amplitudes and phases of a modulation scheme, according to some embodiments.

FIG. 1F is a sketch showing an exemplary embodiment of the raw signal amplitudes and phases of a modulation scheme, according to some embodiments. As depicted in this non-limiting example, the amplitudes 151 of the raw signal (as-received, prior to I/Q branch separation) are shown, transmitted in PAM modulation but now analyzed for the raw as-received signal amplitudes and phases. There are only three raw amplitudes 141, corresponding to the maximum positive I branch summed with the maximum positive Q branch, the minimum positive I branch summed with the minimum positive Q branch, and one of the maximum positive branches summed with the other minimum Q branch. Since the raw signal amplitudes are measured in magnitude, there are no negative levels. Instead, there are various raw signal phases 153. For clarity, only four phases are graphed, representing the four maximum-maximum combinations. The other raw-signal phases are discussed in the next figure.

Also shown, connected by dashed lines, are the raw amplitude levels shifted by additive noise 152, and the raw phases shifted by noise 154. In some cases, the raw signal properties contain the same information as the branch signal properties, and the message may be demodulated using a calibration set derived using either method. In many other cases, however, the two methods differ in sensitivity for various reasons. For example, the raw signal exposes phase-shift distortions, which are only indirectly reflected in the PAM branch amplitudes. In addition, each phase or amplitude measurement is subject to measurement uncertainties, which can be quite different for amplitude and phase measurements. Moreover, the branch separation is not perfect. These limitations become more severe at high frequencies due to short integration times and high phase noise, and become especially critical at high modulation orders due to the closely-spaced amplitude levels.

Therefore, the systems and methods include the receiver analyzing each received demodulation reference and message element using both procedures, the I and Q branch amplitude measurements of PAM, and the raw signal amplitude and phase measurements. The systems and methods further include the receiver comparing those analysis results to reveal faulted message elements.

The following examples disclose a four-point short-form pulse-amplitude demodulation reference, with a length of four reference elements, exhibiting the maximum and minimum amplitude levels of the modulation scheme.

Figure 2A:
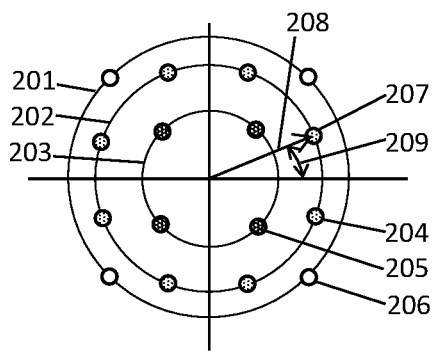
FIG. 2A is a phase chart showing an exemplary embodiment of the raw signal properties of a pulse-amplitude modulation scheme, according to some embodiments.

FIG. 2A is a phase chart showing an exemplary embodiment of the raw signal properties of a pulse-amplitude modulation scheme, according to some embodiments. As depicted in this non-limiting example, a phase chart is a schematic representation of the states of a modulation scheme, in a polar coordinate system in which the phase of the as-received (raw signal) wave is shown azimuthally, and the amplitude of the as-received wave is plotted radially. The large circles 201, 202, 203 represent the amplitude levels of the raw signal wave, and the states of the modulation scheme are shown as points such as 204, 205, 206. Thus the amplitude of a particular state 207 is indicated by the radius 208 and the phase angle 209. The horizontal axis represents zero degrees, or unmodulated carrier, which is generally not used for raw signal modulation. The modulation scheme is 16QAM in this case, with pulse-amplitude modulation.

The points shown in the phase chart correspond to the various branch waves shown in FIG. 1D. The dark-stippled points 205, at the smallest radius 203, are generated by the minimum-amplitude branch waves in positive or negative, specifically the 132 or 133 wave summed with the 136 or 137 wave. This generates the four states 205. The white points 204 are generated by summing the maximum-amplitude waves 131 or 134 with 135 or 138. The light-stippled points 205 are various combinations of one maximum-amplitude branch wave with one minimum-amplitude branch wave, specifically one of 131, 134, 135, 138 added to one of 132, 133, 136, 137.

These combinations result in 16 states as shown. The receiver can identify each received state in two ways: (a) by separating the I-branch and Q-branch signals, measuring their branch amplitudes, and comparing to a first calibration set that includes the predetermined branch amplitude levels, or (b) by measuring the amplitude and phase of the as-received raw signal and comparing to a second calibration set that includes those raw signal amplitude levels and phase levels. The two demodulation procedures have different sensitivities to noise and interference, because noise and interference can distort the amplitude and phase of each wave component separately. For example, PAM does not measure phase directly, while classical amplitude-phase modulation does. In some embodiments, the receiver may perform both demodulation procedures, by measuring the raw signal amplitude and phase, then separating the I and Q branches and measuring their branch amplitudes. Although in ideal circumstances, the raw signal properties are uniquely determined by the branch signals, and vice-versa, the two procedures have different sensitivities to amplitude-shifting and phase-shifting noise or interference. Therefore some distortions may be more readily mitigated with one procedure, while other distortions may be properly treated with the other procedure, and some may be best revealed (and possibly mitigated) by comparing the two procedures for each message element. The receiver can thereby demodulate message elements more accurately, and can identify message elements that are faulted more readily, using both demodulation procedures, according to some embodiments.

Figure 2B:
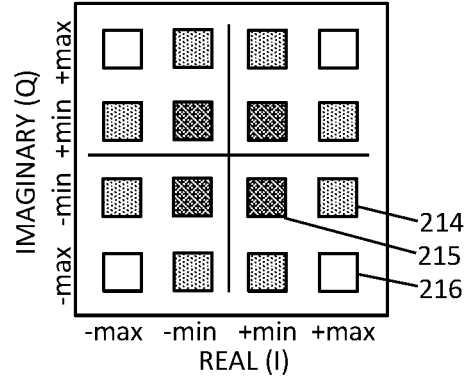
FIG. 2B is a constellation table showing an exemplary embodiment of the states of 16QAM with pulse-amplitude modulation, according to some embodiments.

FIG. 2B is a constellation table showing an exemplary embodiment of the states of 16QAM with pulse-amplitude modulation, according to some embodiments. Each state is shown as a square representing a particular combination of the positive and negative, maximum and minimum, I and Q waves. For example, the real (I) axis represents states generated by multiplexing the positive maximum I-branch amplitude (+max), the positive minimum I-branch amplitude (+min), the negative minimum and maximum amplitudes (−min, −max) as labeled. The vertical imaginary axis is labeled similarly, for the Q-branch component. Thus, for example, the state 216 is generated by multiplexing the maximum positive I-branch wave with the maximum negative Q-branch wave.

The shading corresponds to the points in the previous figure. The white squares such as 216 are generated by multiplexing the maximum I and Q amplitudes (positive and negative combinations), which correspond to the white points 206 in the previous figure. The dark-stipple squares such as 215 are generated by the minimum I and Q amplitudes (positive and negative combinations), corresponding to the dark-stipple points 205. The medium-stipple squares such as 214 are generated by various combinations of the maximum and minimum positive and negative I and Q waves, corresponding to the medium-stipple points 204. Thus the two figures show the same states, but with emphasis on the raw signal properties in FIG. 2A, and focusing on the I and Q branch amplitudes in FIG. 2B.

Figure 2C:
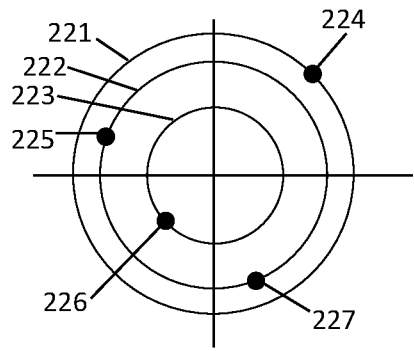
FIG. 2C is a phase chart showing an exemplary embodiment of a 4-point short-form pulse-amplitude demodulation reference, according to some embodiments.

FIG. 2C is a phase chart showing an exemplary embodiment of a 4-point short-form pulse-amplitude demodulation reference, according to some embodiments. As depicted in this non-limiting example, a 16QAM modulation scheme with PAM includes three predetermined raw signal amplitudes 221, 222, and 223. The four-point demodulation reference includes four resource elements, labeled 224, 225, 226, 227. In this case, the four-point demodulation reference explicitly exhibits all three raw signal amplitude levels and all four raw signal phase quadrants, thereby assisting the receiver in constructing a classical amplitude-phase calibration set including the raw signal amplitudes and phases of the as-received signal. In addition, the receiver can separate the I and Q branches, measure their amplitudes, and thereby fill in the predetermined branch amplitude levels in a second calibration set. After filling in the various amplitude and phase levels of the two calibration sets, the receiver can then demodulate each message element of a subsequent message by comparing the raw signal amplitude and phase to the first calibration set, or the branch amplitudes to the second calibration set.

In the depicted case, a first point 224 corresponds to the maximum positive I-branch amplitude multiplexed with the maximum positive Q-branch amplitude, thereby generating the maximum raw signal amplitude, and a raw signal phase of 45 degrees. The demodulation reference also includes another point 226 generated by the minimum negative I-branch and Q-branch amplitudes, thus generating the minimum raw signal amplitude and a phase of 225 degrees. To fill in the calibration set, the receiver can compare the raw signal maximum and minimum amplitudes as exhibited by points 224 and 226, calculate the intermediate raw signal amplitude trigonometrically (that is, with a 90-degree phase-shift), and thereby demodulate the message elements while mitigating additive noise. Specifically, point 224 exhibits the largest raw signal amplitude plus noise, and point 226 exhibits the smallest raw signal amplitude plus noise. In addition, if the modulation order is higher, such as 64QAM or 256QAM, the receiver can calculate the raw signal amplitudes of the intermediate levels from the observed amplitudes by interpolation.

The two other states of the demodulation reference, point 227 and 225, represent combinations of one of the maximum branch amplitudes with one of the minimum branch amplitudes, in various plus and minus combinations. The receiver can use those values to further refine the calibration set levels. For example, the receiver can measure the amplitudes of the raw signals of points 225 and 227, optionally average those measurements for improved resolution, and thereby determine the intermediate amplitude level of the modulation scheme. Alternatively, the receiver can separate the I and Q branches for points 225 and 227, measure the I and Q branch amplitudes for them (which must be equal to either the maximum or minimum branch amplitudes in this case), and thereby refine the maximum and minimum branch amplitude values in the calibration set by averaging. Alternatively, the receiver can use the mixed points 225 and 227 to quantify non-additive noise and interference, by comparing the amplitude and phase values of points 225 and 227 with those of points 224 and 226. In this way, the receiver can in some cases reveal phase-dependent interference or non-linear non-additive effects. In addition, the receiver may detect faults that occur in the demodulation reference itself, by checking the consistency of the amplitude and phase levels as deduced from the maximum and minimum points 224 and 226, versus the min-plus-max points 225 and 227. If a receiver determines that the four points are not mutually consistent, given the 16QAM modulation scheme, the receiver can try several things. First, the receiver can adjust the branch amplitude levels in the calibration set using a best-fit compromise, or the receiver can select a particular misfit point and ignore it, of the receiver can reject the demodulation reference entirely and attempt to demodulate the message using an earlier (and possibly "stale") demodulation reference, or the receiver can reject the message and its associated demodulation reference and request a retransmission, among other options depending on network rules.

Figure 2D:
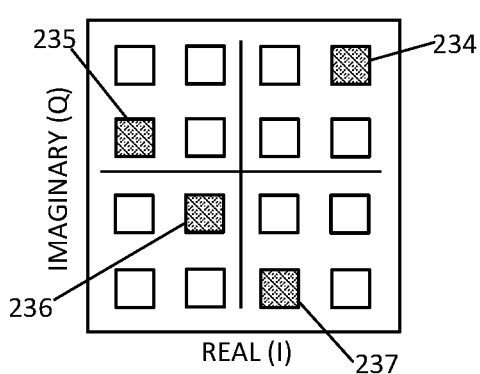
FIG. 2D is a constellation table showing an exemplary embodiment of a 4-point short-form pulse-amplitude demodulation reference specifying four states, according to some embodiments.

FIG. 2D is a constellation table showing an exemplary embodiment of a 4-point short-form pulse-amplitude demodulation reference specifying four states, according to some embodiments. As depicted in this non-limiting example, the real and imaginary components of four reference elements of the demodulation reference include state 234 with the maximum positive I and Q branch amplitudes, state 236 with the minimum negative I and Q branch amplitudes, state 235 and 237 each with one maximum and one minimum I and Q branch combined. The stippled states 234-237 thus correspond to the points 224-227 of the previous figure. The two FIGS. 2C and 2D show the same information in different forms, with FIG. 2C explicitly showing the raw-signal amplitude and phase properties, and FIG. 2D showing the I and Q branches of PAM for the same demodulation reference.

Figure 2E:
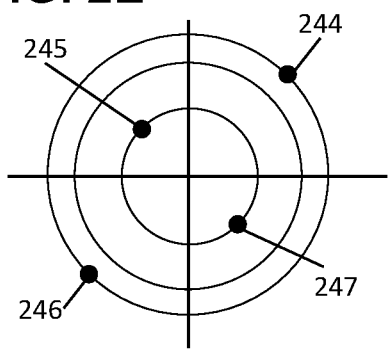
FIG. 2E is a phase chart showing another exemplary embodiment of a 4-point short-form pulse-amplitude demodulation reference, according to some embodiments.

FIG. 2E is a phase chart showing another exemplary embodiment of a 4-point short-form pulse-amplitude demodulation reference, according to some embodiments. As depicted in this non-limiting example, the phase and amplitude of each resource element's raw signal, of a 4-point demodulation reference, include point 244 with the maximum raw signal amplitude and a raw signal phase of 45 degrees. The demodulation reference also includes point 246 having the maximum raw signal amplitude, and a phase of 225 degrees. Also shown are points 245 and 247 with the minimum raw signal amplitude, and phases of 235 and 315 degrees. Although none of the demodulation elements exhibits the middle amplitude, this can be calculated from the other two amplitudes by trigonometrically adding the maximum and minimum amplitudes, as described above.

Figure 2F:
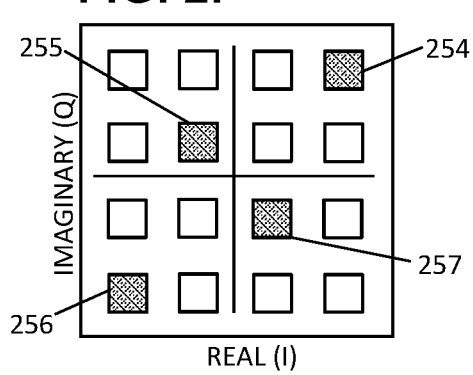
FIG. 2F is a constellation table showing another exemplary embodiment of a 4-point short-form pulse-amplitude demodulation reference specifying four amplitude levels, according to some embodiments.

FIG. 2F is a constellation table showing another exemplary embodiment of a 4-point short-form pulse-amplitude demodulation reference specifying four amplitude levels, according to some embodiments. As depicted in this non-limiting example, the states of 16QAM with PAM modulation are shown versus the I and Q branch amplitudes including positive and negative values. The four stippled states correspond to the points of the previous figure. State 254 is generated by the maximum I and Q positive amplitudes, corresponding to point 244. State 256 is generated by the maximum negative I and Q amplitudes, as point 246. States 255 and 257 are generated by the minimum I and Q amplitudes, in this case one being positive and the other negative, thereby corresponding to points 245 and 247.

An advantage of providing, in the demodulation reference, two opposite maximum-amplitude states, such as 254 and 256, may be that the receiver can readily calculate the other amplitude levels of the modulation scheme by interpolation. In the present example, no such interpolation is necessary because the other two states, 255 and 257, exhibit the minimum branch amplitudes, thereby enabling the complete calibration set to be filled in, based on the exhibited amplitude values alone. If the modulation scheme were, say, 256QAM, the receiver can calculate the intermediate amplitude levels by interpolating between the two maximal states 254 and 256 using known amplitude ratios. Alternatively, and even better, the receiver can interpolate between the maximum branch amplitude (as determined by 254 and 254), and the minimum branch amplitude (as determined by 255 and 257). In either case, the receiver can readily calculate the calibration set from the four-point demodulation reference.

Figure 2G:
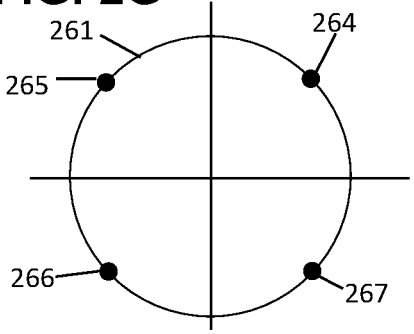
FIG. 2G is a phase chart showing an exemplary embodiment of a 4-point short-form pulse-amplitude demodulation reference for QPSK, according to some embodiments.

FIG. 2G is a phase chart showing an exemplary embodiment of a 4-point short-form pulse-amplitude demodulation reference for QPSK, according to some embodiments. As depicted in this non-limiting example, the four states of QPSK can be described according to the positive and negative I and Q signals, all at a single branch amplitude and therefore a single raw signal amplitude 261. The four raw signal points are 264, 265, 266, and 267, separated by 90 degrees, with a 45-degree carrier-suppression offset, on a single raw signal amplitude.

Figure 2H:
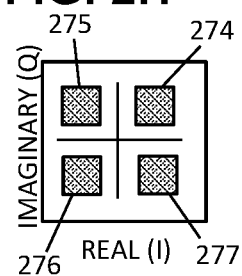
FIG. 2H is a constellation table showing an exemplary embodiment of a 4-point short-form pulse-amplitude demodulation reference for QPSK, according to some embodiments.

FIG. 2H is a constellation table showing an exemplary embodiment of a 4-point short-form pulse-amplitude demodulation reference for QPSK, according to some embodiments. The four states 274, 275, 276, 277 are formed by multiplexing positive and negative I and Q branch signals at a constant branch amplitude. For example, state 277 is formed from the positive I wave plus the negative Q wave, both at the same branch amplitude. Thus the states 274, 275, 276, and 277 correspond to the points 264, 265, 266, 267 of the previous figure.

An advantage of providing a four-point pulse-amplitude short-form demodulation reference may be that the I and Q branch amplitude values provided in the demodulation reference may be used to demodulate the message elements. Another advantage may be that the provided amplitude values can explicitly exhibit all of the modulation scheme amplitude and phase levels directly (as in 16QAM), or can be interpolated to calculate all of the unexhibited amplitude and phase levels (as in 256QAM). Another advantage may be that intractable interference can be detected by inconsistencies between the raw signal phase and amplitude, versus the I and Q branch amplitudes. For example, the message element may be faulted if the two methods indicate different modulation states. Another advantage may be that the amplitude levels of the modulation scheme may be determined by interpolating between maximum and minimum branch amplitudes, which are exhibited in the short-form pulse-amplitude demodulation reference. Another advantage may be that the four-point short-form demodulation reference is short, only four reference elements, and thus may be appended or prepended to other messages, or interspersed within longer messages, to provide frequent updates of the specific modulation levels used in an accompanying message, including effects of interference. Alternatively, the short-form demodulation reference may be supplied separately from a message, such as periodically, such as in the first four subcarriers of the first uplink or downlink symbol period of each slot, or the first four symbol periods of a single subcarrier in each slot, for example. Another advantage may be that the four-point short-form demodulation reference may include the maximum and minimum branch amplitude levels of the modulation scheme, in which case there may be no need to extrapolate amplitude values beyond those explicitly exhibited in the short-form demodulation reference, thereby minimizing calculation errors. Another advantage may be that distortions, in amplitude or phase or both, due to noise or interference, may be present in the amplitude and phase values of the reference elements, and therefore those distortions may be canceled when the demodulation reference values are then used to demodulate a subsequent message.

Another advantage may be that the procedures of FIG. 2A-2H may be implemented as a software (or firmware) update, without requiring new hardware development, and therefore may be implemented at low cost, according to some embodiments. The procedures of FIG. 2A-2H may be implemented as a system or apparatus, a method, or instructions in non-transient computer-readable media for causing a computing environment, such as a user device, a base station, or other signally coupled component of a wireless network, to implement the procedure. Another advantage may be that the depicted low-complexity procedures may be compatible with devices that may have difficulty complying with prior-art registration procedures. Other advantages may be apparent to one of ordinary skill in the art, given this teaching. The advantages listed in this paragraph are also true for other lists of advantages presented for other embodiments described below.

Figure 3A:
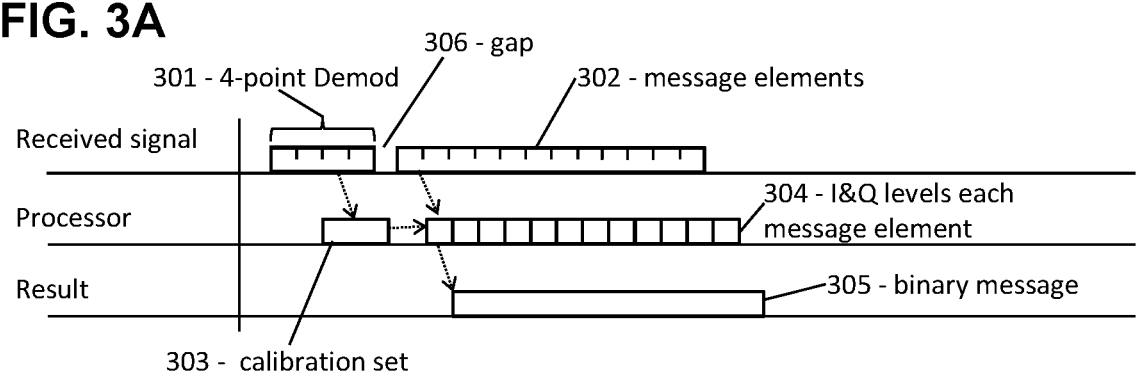
FIG. 3A is a sequence chart showing an exemplary embodiment of a process for demodulating a message using a four-point short-form pulse-amplitude demodulation reference, according to some embodiments.

FIG. 3A is a sequence chart showing an exemplary embodiment of a low-complexity procedure for demodulating a message using a short-form pulse-amplitude demodulation reference, according to some embodiments. Actions and events of a receiver are shown on the first line, then actions or events of a processor connected to the receiver on the second line, and a result or processor output is shown on the last line. In sequence charts, messages are usually shown time-spanning for clarity, but the messages may be frequency-spanning as well. Arrows show timing or information flow. As depicted in this non-limiting example, the demodulation reference is a four-point short-form pulse-amplitude demodulation reference 301, followed by an optional gap 306, and a message 302 which is to be demodulated, with little marks demarking each of the message elements. The gap 306 may be one symbol period or more, and may include zero transmission, or transmission with an amplitude below the lowest amplitude level of the modulation scheme, or unmodulated carrier (at the subcarrier frequency), or other characteristic signal not resembling the data. The gap 306 may be positioned between the demodulation reference 301 and the message, thereby indicating the end of the demodulation reference 301 and the starting point of the message 302, which may be helpful to the receiver. The processor may analyze the reference elements of the demodulation reference 301 and may thereby determine the amplitude and phase of the raw signal, and/or the I and Q branch amplitudes, and thereby fill in the demodulation levels in the calibration set 303. If necessary, the processor may interpolate or otherwise calculate additional levels of the modulation scheme based on those exhibited in the demodulation reference 301.

Then, the processor may analyze each resource element of the message 302, by comparing the I and Q branch amplitudes of each message element 302 to the calibration set 303, or comparing the raw signal amplitude and phase of each message element 302 to the calibration set 303, or both. Hence the receiver can determine the modulation state of each message element 304 according to the closest match between the amplitudes of the message element and the predetermined amplitude levels of the calibration set.

The predetermined modulation levels in the calibration set may be represented numerically. For example, each amplitude (and/or phase) level in the calibration set 303 may be assigned a binary code. In 16QAM with pulse-amplitude modulation, there are four branch amplitude levels, so the code may be a two-bit binary code, such as 11 for the maximal negative amplitude level, 10 for the minimal negative level, 00 for the minimal positive level, and 01 for the maximal positive level. In some embodiments, the I branch and Q branch share the same set of four branch amplitude levels, while in other embodiments, separate amplitude levels are determined for the I and Q branches. In some embodiments, the modulation state of each message element 304 may be represented by a 4-bit code indicating which branch amplitude levels in the calibration set most closely match the branch amplitude values in the message element. The 4-bit code may show the I-branch amplitude code, followed by the Q-branch amplitude code, for each message element. For example, a message element modulated with the maximally negative amplitude level in the I branch and the maximally positive level in the Q branch would be 1101. The message 302 can then be represented by a series 305 of binary bits containing the message information.

The bit-level representation generally depends on the modulation scheme. BPSK represents one bit per message element, QPSK has 2 bits per message element, 16QAM has 4 bits per message element, 64QAM requires 6 bits per message element, and 256QAM would need 8 bits per message element. Assuming the I and Q branches share the same branch amplitude levels, QPSK has only one branch amplitude level, which may be positive or negative in each branch of each message element. 16QAM has four predetermined branch amplitude levels, 64QAM has eight, and 256QAM has 16 branch amplitude levels. In some embodiments, the same predetermined branch amplitude levels may be assumed in the calibration set, for both I and Q branches. However, for more complex noise and interference mitigation, the receiver can determine the predetermined I-branch amplitude levels separately from the Q-branch amplitude levels, based on the values exhibited in the four-point pulse-amplitude demodulation reference. As a valuable consistency check, the receiver can also determine the amplitude and phase levels of the raw signal, and determine whether the modulation state indicated by the raw signal parameters matches that implied by the PAM branch-amplitude levels.

Figure 3B:
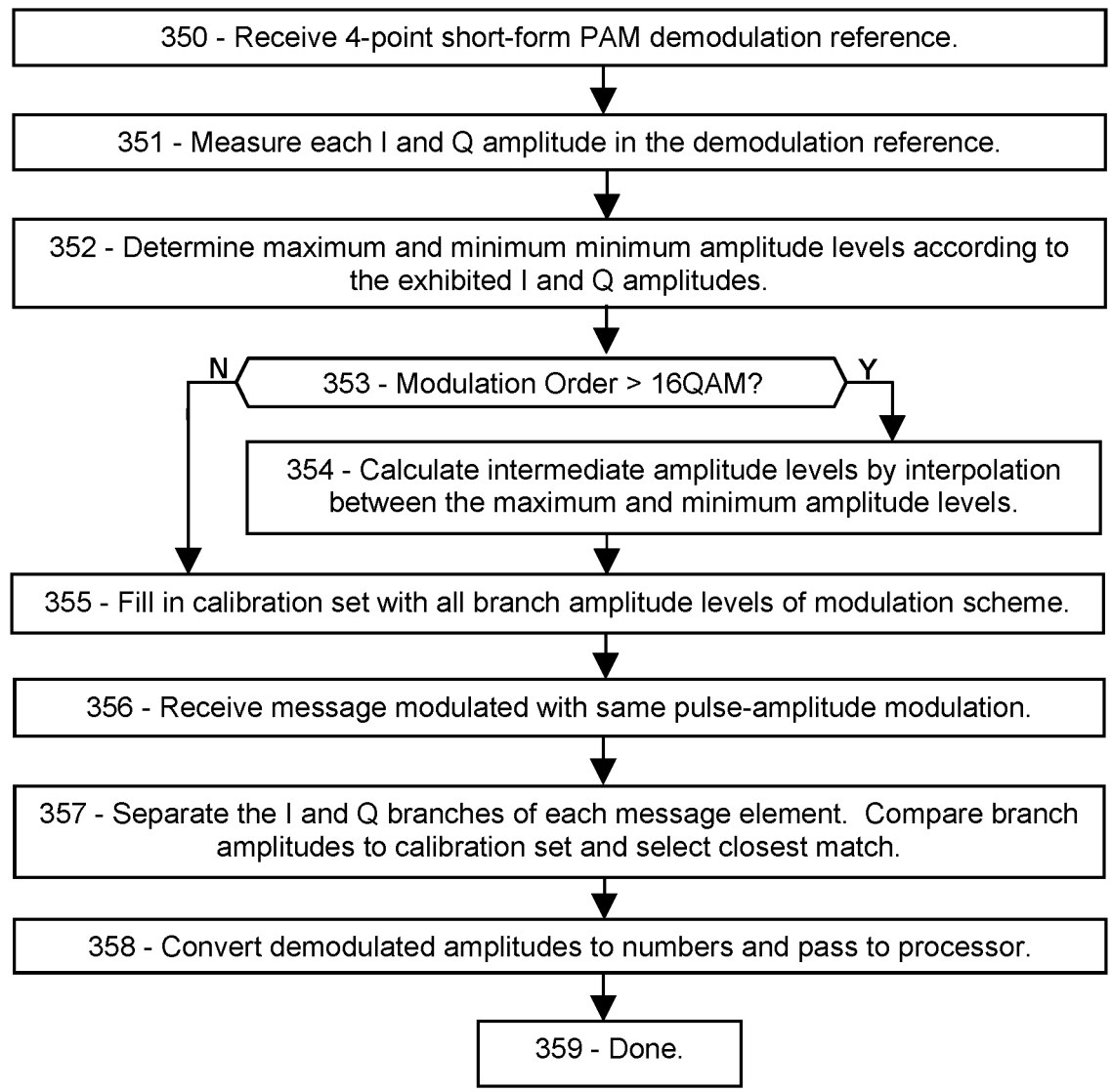
FIG. 3B is a flowchart showing an exemplary embodiment of a process for demodulating a message using a four-point short-form pulse-amplitude demodulation reference, according to some embodiments.

FIG. 3B is a flowchart showing an exemplary embodiment of a low-complexity procedure for using a short-form pulse-amplitude demodulation reference, according to some embodiments. As depicted in this non-limiting example, at 350 a receiving entity receives a demodulation reference with four resource elements and, at 351, separately measures the amplitude values of the I and Q branches for each of its four reference elements. At 352, the receiver determines the maximum and minimum, positive and negative, branch amplitudes, for example by averaging the various redundant amplitude measurements of the maximum value in the four reference elements, and likewise for the minimum amplitude values. At 353, the receiver determines whether the modulation is higher than 16QAM (according to system information or an RRC message or otherwise). If the modulation is higher than 16QAM, such as 64QAM or 256QAM, then at 354 the receiver calculates the remaining branch amplitude levels from those explicitly exhibited in the short-form demodulation reference elements, by interpolating between the maximum and minimum amplitude values or by extrapolating from the exhibited values, for example. At 355, the branch amplitude values from the short-form demodulation reference elements and, if applicable, from the calculations, are accumulated as a calibration set which includes all of the predetermined branch amplitude levels of the modulation scheme. In addition, or alternatively, the raw signal parameters (four amplitudes and four phases for the case of 16QAM) may be accumulated in a second calibration set, and used for raw signal consistency checks, fault identification, and other uses.

At 356 (if not sooner), the message to be demodulated is received. At 357, each message element is compared to the branch amplitudes in the calibration set. The I and Q branch amplitude values of each message element are thereby identified according to the closest predetermined amplitude levels in the calibration set, and each message element is thereby demodulated. Optionally, the receiver may also demodulate the message element according to the raw signal amplitude and phase using a second calibration set, and check for errors. At 358, a binary representation of the message is prepared by concatenating the numbers associated with each branch amplitude level of each message element, and is done at 359.

An advantage of providing a four-point short-form demodulation reference may be that it is short, just four reference elements. Another advantage may be that four modulation states can be explicitly provided, thereby enabling direct demodulation of QPSK or 16QAM without interpolation or extrapolation, in some embodiments. Another advantage may be that higher modulation schemes such as 64QAM or 256QAM may be demodulated, using interpolation or extrapolation to derive the remaining levels from the explicitly provided levels. Another advantage may be that the demodulation reference values may include any effects of noise and interference, so that those distortions may be canceled when the received reference values are used to demodulate a subsequent message. Another advantage may be that the demodulation reference can include multiple determinations of the same parameters, such as the maximum and/or minimum branch amplitude values, and thereby obtain a more precise determination by averaging.

The systems and methods further include a two-point short-form pulse-amplitude demodulation reference with a length of two reference elements, as in the following examples.

Figure 4A:
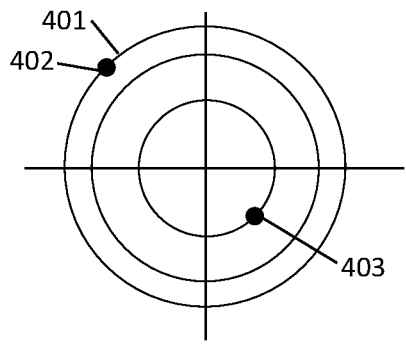
FIG. 4A is a phase chart showing an exemplary embodiment of a 2-point short-form pulse-amplitude demodulation reference, according to some embodiments.

FIG. 4A is a phase chart showing an exemplary embodiment of a short low-complexity demodulation reference such as a two-point short-form demodulation reference for PAM modulation, according to some embodiments. As depicted in this non-limiting example, the short-form demodulation reference includes two points representing two reference elements with particular modulations. In this case, the modulation scheme is 16QAM and the type is PAM, but the interpretation and graph pertain to classical amplitude and phase measurements of the raw signal. The raw signal amplitude levels are indicated as circles 401. The demodulation reference includes a first reference element 402 modulated with the maximum raw signal amplitude, and a phase of 135 degrees. This corresponds to the maximum negative I-branch amplitude and the maximum positive Q-branch amplitude in PAM. The demodulation reference also includes a second reference element 403 exhibiting the smallest raw signal amplitude with a phase of 315 degrees, which corresponds to the minimum positive I-branch amplitude and the minimum negative Q-branch amplitude. The short-form demodulation reference thereby exhibits the maximum and minimum branch amplitude levels and the maximum and minimum raw signal levels of the modulation scheme. The intermediate raw signal amplitude level can be calculated trigonometrically from the exhibited minimum and maximum levels, as mentioned. If the modulation order is higher than 16QAM, the intermediate levels can be calculated as well, assuming the branch amplitudes are equally spaced apart, as is conventional. The set of raw signal amplitude and phase levels derived from the demodulation reference constitutes the calibration set, and the message elements can be demodulated by comparison with the predetermined amplitude levels of the calibration set. Alternatively, the message may be demodulated by comparing the message element I and Q branch amplitudes to the other calibration set, containing the branch amplitude levels. The two approaches should indicate the same state of the modulation scheme, and any inconsistency may indicate some kind of pathological interference or a reception error or other mishap, and in any case the inconsistent message elements are probably faulted or at least "suspicious". Since the demodulation reference includes the effects of noise and interference, the message elements may be demodulated with the noise and interference largely mitigated, using either the raw-signal amplitude-phase calibration set, or the second calibration set based on the I and Q branch amplitudes. Therefore, a short demodulation reference occupying just two resource elements is sufficient for demodulating a message with noise and interference cancellation.

Figure 4B:
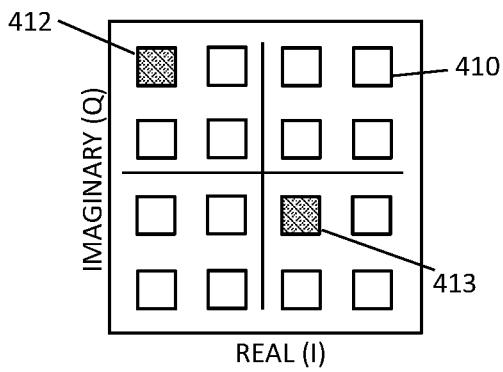
FIG. 4B is a constellation table showing an exemplary embodiment of a 2-point short-form pulse-amplitude demodulation reference, according to some embodiments.

FIG. 4B is a constellation table showing an exemplary embodiment of a short low-complexity demodulation reference such as a 2-point short-form pulse-amplitude demodulation reference, according to some embodiments. As depicted in this non-limiting example, the table shows valid modulation states 410 of, in this case, 16QAM, with the I-branch amplitude horizontally and the Q-branch amplitude vertically. Two states 412 and 413 are stippled, corresponding to the states 402, 403 of FIG. 4A. The state 412 represents the first reference element of the two-point short-form demodulation reference, which has the maximum negative real amplitude and the maximum positive imaginary amplitude, while the second stippled point 413 has the minimum positive real amplitude and the minimum negative imaginary amplitude. Thus the demodulation reference exhibits the I and Q maximum and minimum amplitude levels, from which the calibration set can be found by varying the sign and I-Q position. The message elements may then be demodulated by comparing each I and Q branch amplitude of each message element to the calibration set. If the reference elements include the maximum and minimum branch amplitude levels, the two-point short-form demodulation reference provides sufficient information to generate the complete calibration set, from which the remaining amplitude and phase levels can be calculated by interpolation, as described above. The receiver can then fill in the amplitude levels of a calibration set and demodulate a subsequent message by comparing each message element I and Q branch amplitude to the calibration set amplitude levels, selecting the closest match, and thereby demodulate the message while largely canceling noise and interference.

Figure 4C:
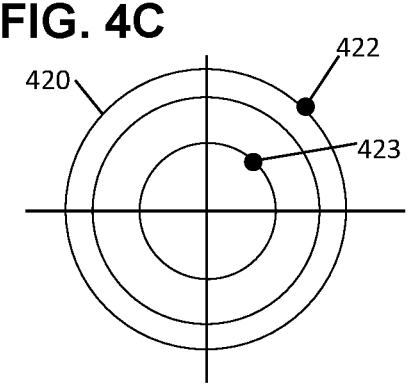
FIG. 4C is a phase chart showing another exemplary embodiment of a 2-point short-form pulse-amplitude demodulation reference specifying two amplitude and phase levels, according to some embodiments.

FIG. 4C is a phase chart showing another exemplary embodiment of a short low-complexity demodulation reference such as a two-point short-form pulse-amplitude demodulation reference, according to some embodiments. As depicted in this non-limiting example, the three raw signal amplitudes of 16QAM, transmitted with PAM, are shown as circles 420, and two particular states are shown as points 422 and 423. The first point 422 exhibits the maximum positive I and Q branch amplitude levels, resulting in the largest raw signal amplitude. The second point 423 has the minimum positive I-branch and Q-branch amplitude levels, resulting in the smallest raw signal amplitude, also a 45-degree phase. The receiver can readily calculate the intermediate raw signal amplitude by trigonometrically summing the exhibited maximum and minimum amplitudes, specifically 0.746 times the largest raw signal amplitude for 16QAM.

Figure 4D:
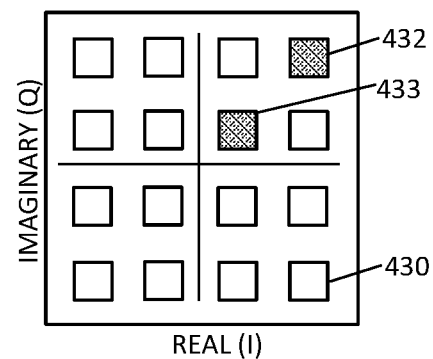
FIG. 4D is a constellation table showing another exemplary embodiment of a for a 2-point short-form pulse-amplitude demodulation reference specifying two amplitude and phase levels, according to some embodiments.

FIG. 4D is a constellation table showing an exemplary embodiment of a short low-complexity demodulation reference such as a 2-point short-form pulse-amplitude demodulation reference, according to some embodiments. As depicted in this non-limiting example, the modulation states of 16QAM are shown as squares 430, and two of the modulation states are shown stippled as 432 and 433. The first state 432 exhibits the maximum positive I and Q amplitude levels, and the second state 433 exhibits the minimum positive I and Q amplitude levels. The receiver can calculate the other modulating states, and their raw signal or branch amplitudes, from those exhibited in the two states 432-433 of the demodulation reference. The constellation table shows the same set of states as the phase chart of FIG. 4C.

Figure 4E:
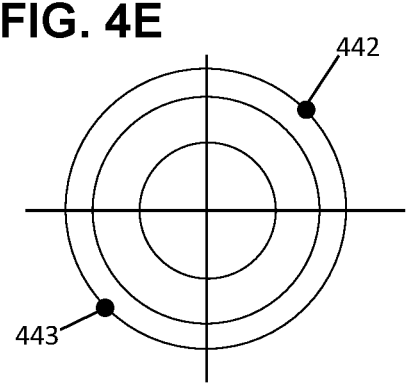
FIG. 4E is a phase chart showing another exemplary embodiment of a 2-point short-form pulse-amplitude demodulation reference specifying two amplitude and phase levels, according to some embodiments.

FIG. 4E is a phase chart showing an exemplary embodiment of a short low-complexity demodulation reference such as a two-point short-form pulse-amplitude demodulation reference for 16QAM, according to some embodiments. As depicted in this non-limiting example, the two indicated states 442, 443 are modulation states with the maximum raw signal amplitude, and raw signal phase of 45 degrees and 225 degrees, respectively. The receiver can calculate the minimum raw signal amplitude according to a predetermined amplitude ratio, such as 3 for 16QAM, and then can calculate the intermediate raw signal amplitude trigonometrically, as mentioned above. An advantage of the demodulation reference providing two opposite-phased maximum-amplitude reference elements may be that the other levels and their phases can be calculated by interpolation without the need for extrapolation, thereby minimizing calculation errors in most cases. In addition, the I and Q branch amplitudes can be calculated from each of the two exhibited points. A further advantage may be that those redundant derivations can be averaged to reduce the measurement errors. A message can then be demodulated while largely cancelling effects of noise and interference according to the amplitude values thus obtained, according to some embodiments.

Figure 4F:
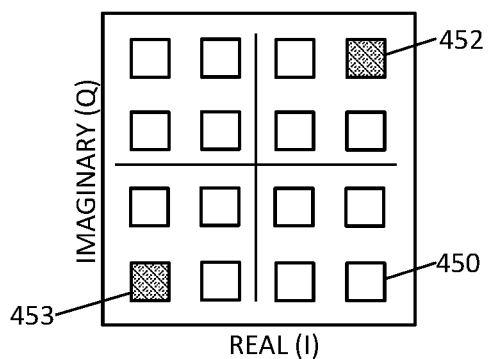
FIG. 4F is a constellation table showing another exemplary embodiment of a 2-point short-form pulse-amplitude demodulation reference specifying two amplitude and phase levels, according to some embodiments.

FIG. 4F is a constellation table showing an exemplary embodiment of a short low-complexity demodulation reference such as a two-point short-form pulse-amplitude demodulation reference for 16QAM, according to some embodiments. As depicted in this non-limiting example, the constellation table shows the 16 states 450 of 16QAM, with two of the states 452 and 453 stippled, corresponding to the maximum positive I and Q branch amplitudes for 452, and the maximum negative I and Q branch amplitudes for 453. Thus the states 452, 453 correspond to the points 442, 443 of the previous figure. The other 14 states of 16QAM can then be calculated deterministically from the values exhibited in the two resource elements of the demodulation reference.

Figure 4G:
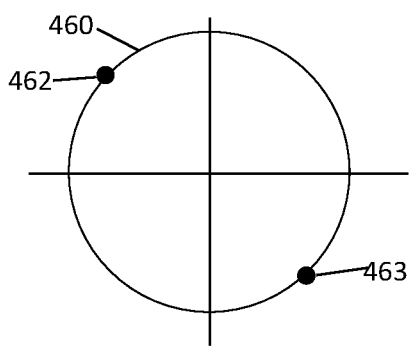
FIG. 4G is a phase chart showing an exemplary embodiment of a 2-point short-form pulse-amplitude demodulation reference for QPSK, according to some embodiments.

FIG. 4G is a phase chart showing an exemplary embodiment of a short low-complexity demodulation reference such as a two-point short-form pulse-amplitude demodulation reference for a QPSK modulation, according to some embodiments. As depicted in this non-limiting example, the circle 460 represents a particular amplitude, and the two indicated states 462, 463 are raw signal modulation states with phase and amplitude as shown. For QPSK, the phase is varied between four values spaced apart by 90 degrees, and the amplitude is held constant. Thus the two points 462 and 463 are at the same radius 460, thereby indicating the same raw signal amplitude, as required for QPSK. The other two states of QPSK can then be derived by adding 90 degrees in raw signal phase to each of the exhibited states.

Figure 4H:
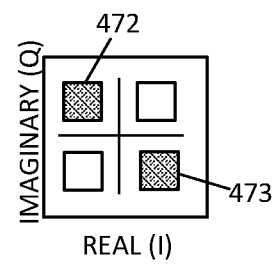
FIG. 4H is a constellation table showing an exemplary embodiment of a 2-point short-form pulse-amplitude demodulation reference for QPSK, according to some embodiments.

FIG. 4H is a constellation table showing an exemplary embodiment of a short low-complexity demodulation reference such as a two-point short-form pulse-amplitude demodulation reference for QPSK, according to some embodiments. As depicted in this non-limiting example, the modulation table shows the four states of QPSK, with two of the states 472 and 473 indicated, all at the same branch amplitude. State 472 may be generated from the negative I-branch signal multiplexed with the positive Q-branch signal, while the state 473 may be generated from the positive I-branch and negative Q-branch signals. Messages modulated in QPSK can be demodulated using the two-point short-form demodulation reference by calculating the two non-exhibited states (by reversing the signs on the various branch amplitude values), thereby determining the complete calibration set including the four QPSK states.

An advantage of the two-point short-form demodulation reference in PAM may be that it is short, only two reference elements. Another advantage may be that the two-point short-form demodulation reference may be added to another message, even a short message, without undue consumption of resources. Another advantage may be that the two-point short-form pulse-amplitude demodulation reference may serve as a modulation calibration for various orders of quadrature amplitude modulation or phase-shift keying, since the receiver can readily calculate the non-exhibited branch levels based on the branch amplitude values (or the raw signal amplitude and phase values) provided in the reference elements of the demodulation reference. Another advantage may be that distortions, in amplitude or phase or both, due to noise or interference, may be included in the amplitude and phase values of the demodulation reference elements, and therefore those distortions may be canceled when used to demodulate a subsequent message.

Figure 5A:
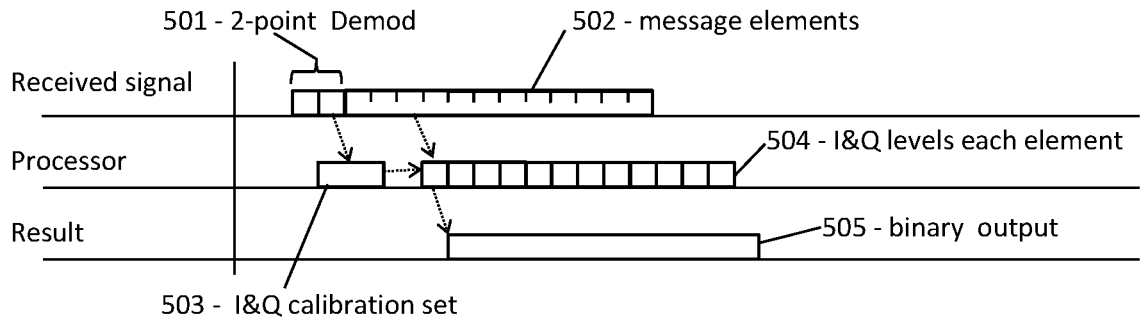
FIG. 5A is a sequence chart showing an exemplary embodiment of a process for demodulating a message using a two-point short-form pulse-amplitude demodulation reference, according to some embodiments.

FIG. 5A is a sequence chart showing an exemplary embodiment of a low-complexity procedure for providing a two-point short-form demodulation reference, according to some embodiments. The received signal is shown on the first line, a processor on the second line, and results are shown on the third line. As depicted in this non-limiting example, the demodulation reference is a two-point short-form pulse-amplitude demodulation reference 501, followed by a message 502 which is to be demodulated. In this case, the message 502 is concatenated directly to the demodulation reference 501, with no gap. The receiver first analyzes the demodulation reference elements and thereby determines I and Q branch amplitudes, and optionally also the raw signal amplitude and phase levels. The receiver then performs any additional calculations (such as interpolation or sign changes) to fill in intermediate modulation levels (if any), and accumulates those modulation levels in a calibration set 503. In this case, the 2-point short-form demodulation reference exhibits the maximum and minimum I and Q branch amplitude modulation levels. Thus the processor can determine the in-phase and quad-phase (I&Q) branch amplitude levels of the modulation scheme.

Then, the processor analyzes each element of the message 502, by separating the I and Q branches for each message element, comparing the branch amplitudes to the calibration set 503, and thereby assigning a real and imaginary amplitude modulation level 504 to each of the message elements. In addition, each amplitude level in the calibration set may be assigned a binary code or other numerical representation, and the message 502 may thereby be rendered as an output binary string 505. In this case, the message 502 is represented by a series of binary bits 505, by concatenating the I and Q branch amplitude codes for each message element.

Figure 5B:
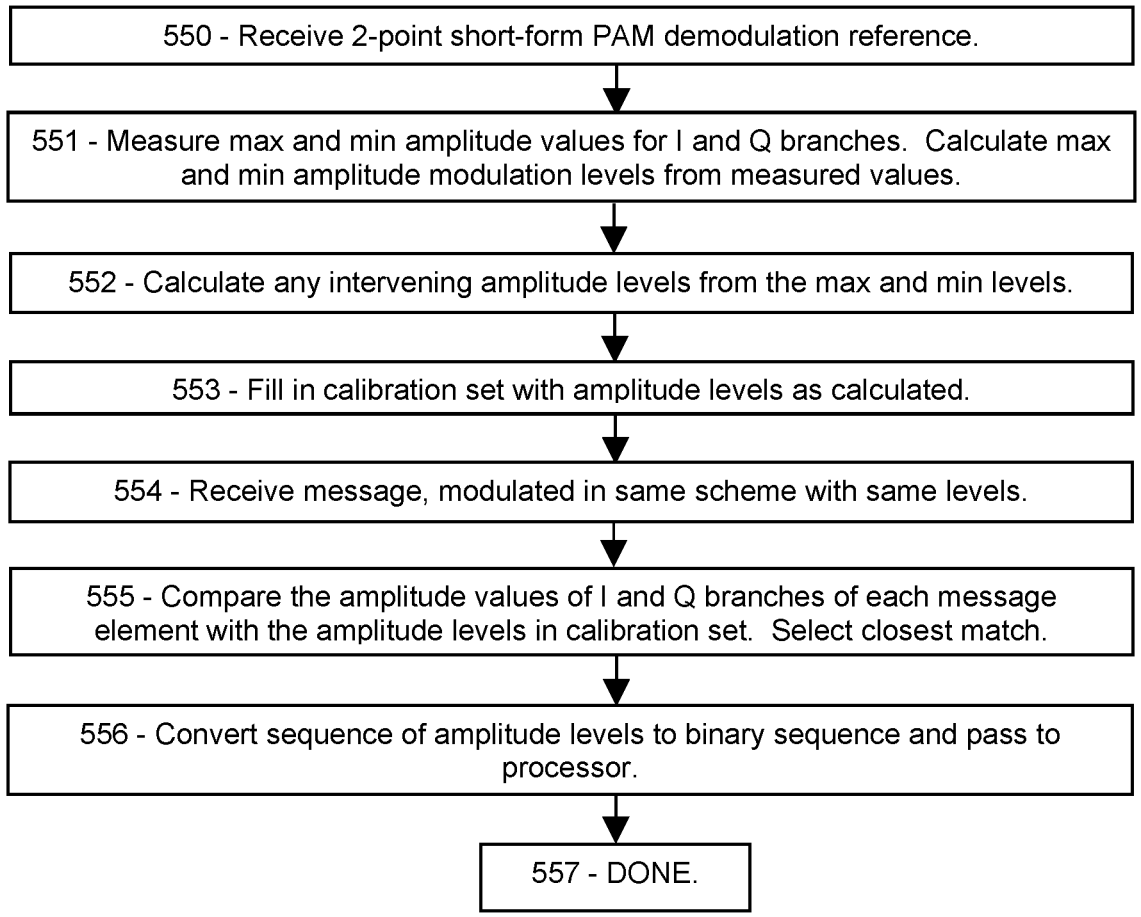
FIG. 5B is a flowchart showing an exemplary embodiment of a process for demodulating a message using a two-point short-form pulse-amplitude demodulation reference, according to some embodiments.

FIG. 5B is a flowchart showing an exemplary embodiment of a low-complexity procedure for using a demodulation reference, according to some embodiments. As depicted in this non-limiting example, at 550 the receiver receives a 2-point short-form PAM demodulation reference. At 551, the receiver measures the maximum and minimum branch amplitude values as provided in the two demodulation reference elements. At 552, a processor calculates any remaining amplitude levels according to the branch amplitude levels provided explicitly in the demodulation reference. At 553, the processor fills in the branch amplitude levels of the modulation scheme. At 554, (if not sooner), the message is received. At 555, each message element is compared to the branch amplitude calibration levels, thereby determining the I and Q amplitudes by which each message element was initially modulated. At 556, a binary representation of the message is prepared by concatenating the amplitude and phase codes of the various message elements, and the procedure is done at 557.

An advantage of providing a two-point short-form demodulation reference may be that it is short, just two reference elements. Another advantage may be that the maximum and minimum branch amplitude modulation states can be explicitly provided and the receiver can then determine all the amplitude modulation states of the modulation scheme using the principles and methods disclosed, according to some embodiments. Another advantage may be that distortions, in amplitude or phase or both, due to noise or interference, may be included in the branch amplitude values of the demodulation reference elements, and therefore those distortions may be canceled when those levels are then used to demodulate a subsequent message.

The systems and methods further include a one-point short-form demodulation reference, with a length of just one reference element, as in the following examples.

Figure 6A:
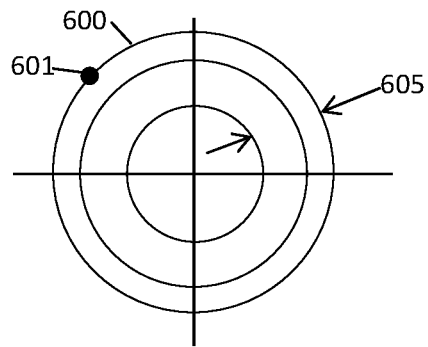
FIG. 6A is a phase chart showing an exemplary embodiment of a 1-point short-form pulse-amplitude demodulation reference, according to some embodiments.

FIG. 6A is a phase chart showing an exemplary embodiment of a very short low-complexity demodulation reference such as a one-point short-form demodulation reference, according to some embodiments. As depicted in this non-limiting example, the circles 600 represent raw signal amplitude levels, and the indicated state 601 is a modulation state at the maximum raw signal amplitude and a raw signal phase of 135 degrees, which can be generated by multiplexing the maximum negative I-branch signal with the maximum positive Q-branch signal. Also shown is the width 605 of the raw signal amplitude modulation levels 600, extending from the minimum amplitude to the maximum amplitude of the raw signal. For the case shown, the maximum amplitude is 3 times the minimum. The amplitude ratio is the ratio of the maximum raw signal amplitude level divided by the minimum raw signal amplitude level in the current modulation scheme. Alternatively, and equivalently, amplitude ratio equals the maximum positive branch amplitude level divided by the minimum positive branch amplitude level. The one-point short-form demodulation reference may be used to demodulate elements of messages modulated in QAM or PSK, with pulse-amplitude modulation, so long as the amplitude ratio is known to the receiver. The amplitude ratio may be determined via convention, system information data, an RRC message, or otherwise.

The raw signal amplitude levels can be found according to the single demodulation reference element and the known (maximum divided by minimum) amplitude ratio. For QPSK, the amplitude ratio is 1.0, and there is no amplitude modulation. Conventionally, if the amplitude ratio is 3, the modulation scheme is 16QAM, 7 for 64QAM, and 15 for 256QAM. In addition, the receiver can calculate the maximum branch amplitude equal to the raw signal amplitude times 0.707, and then can calculate the minimum branch amplitude according to the amplitude ratio, and then can derive the other branch amplitude values by interpolation. Therefore, a demodulation reference of a single modulated point is sufficient to determine all of the I-Q branch amplitudes and the raw signal amplitude and phase levels, and therefore all the modulation states, of a modulation scheme, including PSK and QAM type modulation schemes. Since the single reference element exhibits the maximum I and Q branch amplitude values, including the effects of attenuation and receiver sensitivity, the calibration set may also include those factors, and therefore enable demodulation of the subsequent message. In addition, the receiver can measure the effects of noise and interference by comparing the I-branch amplitude to the Q-branch amplitude. For the state 601, those two amplitudes should be equal in magnitude and opposite in sign, if there is no additive noise. The presence of noise can be quantified by adding the two branch amplitude values and dividing by two. That noise level can then be added to each of the branch amplitude levels of the modulation scheme to mitigate additive noise in the subsequent message.

The one-point short-form pulse-amplitude demodulation reference is therefore able to provide a complete calibration set including all of the states and levels of the modulation scheme, including signal attenuation, receiver sensitivity, and additive noise or interference, when analyzed as described, according to some embodiments.

Figure 6B:
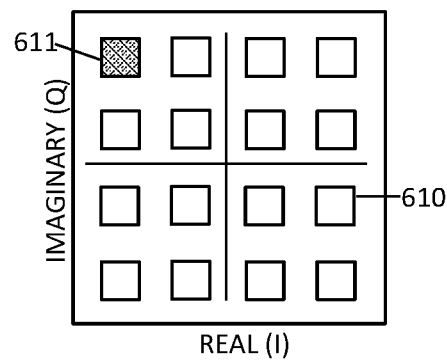
FIG. 6B is a constellation table showing an exemplary embodiment of a 1-point short-form pulse-amplitude demodulation reference, according to some embodiments.

FIG. 6B is a constellation table showing an exemplary embodiment of a very short low-complexity demodulation reference such as a one-point short-form demodulation reference, according to some embodiments. As depicted in this non-limiting example, the table shows the sixteen states 610 of 16QAM with pulse-amplitude modulation. One state 611 is stippled, corresponding to the state 601 shown in the previous figure. The state 611 corresponds to the maximum negative I branch signal multiplexed with the maximum positive Q branch signal. Thus the two charts of FIGS. 6A and 6B show the same information but in different forms. Messages modulated in 16QAM can be demodulated using the depicted constellation table, as long as the amplitude ratio is known. The magnitudes of the branch amplitudes include the effects of attenuation and receiver sensitivity, while the difference in magnitudes is a measure of additive noise or interference, assuming the I and Q branches are affected in the same way (that is, no pathological or phase-dependent or amplitude-dependent or multiplicative distortions). For higher orders of modulation, the intervening levels can be found by interpolating, thereby filling in the calibration set including all the branch amplitude levels of the modulation scheme.

Figure 6C:
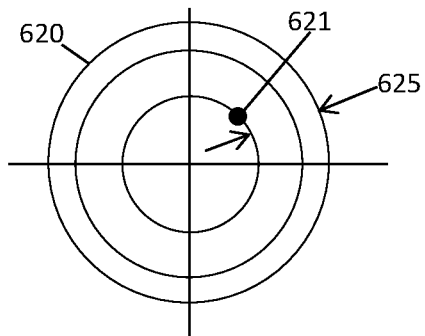
FIG. 6C is a phase chart showing another exemplary embodiment of a 1-point short-form pulse-amplitude demodulation reference, according to some embodiments.

FIG. 6C is a phase chart showing another exemplary embodiment of a very short low-complexity demodulation reference such as a one-point short-form PAM demodulation reference, according to some embodiments. The one-point demodulation reference may be used to calibrate the I and Q branch amplitude levels, and/or the raw signal amplitude and phase levels, by which the message elements of messages are modulated. As depicted in this non-limiting example, the circles 620 represent the raw signal amplitude levels. Unlike the previous example, the indicated state 621 is modulated at the minimum raw signal amplitude and a raw signal phase of 45 degrees. Also shown is the width of the amplitude levels as 625, extending from the minimum raw signal amplitude to the maximum raw signal amplitude. For the case shown, the amplitude ratio (maximum/minimum) is 3; hence the maximum raw signal amplitude level equals the exhibited minimum amplitude level times the amplitude ratio. The remaining amplitude levels may be calculated by interpolation between the minimum and maximum raw signal values. Alternatively, or in addition, the I and Q branch amplitudes can be found by dividing the maximum and minimum raw signal amplitudes by 1.414 as described above.

Figure 6D:
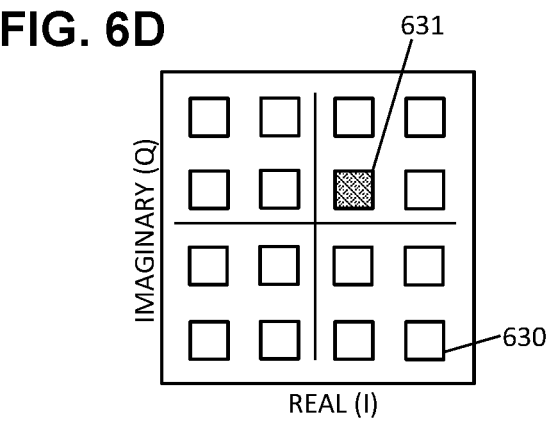
FIG. 6D is a constellation table showing another exemplary embodiment of a 1-point short-form pulse-amplitude demodulation reference, according to some embodiments.

FIG. 6D is a constellation table showing an exemplary embodiment of a very short low-complexity demodulation reference such as a one-point short-form demodulation reference in PAM, according to some embodiments. As depicted in this non-limiting example, the table shows the sixteen states 630 of 16QAM, with one state 631 stippled, corresponding to the state 621 shown in the previous figure. The state 631 corresponds to the minimum positive I-branch amplitude multiplexed with the minimum positive Q-branch amplitude. Thus the two charts of FIGS. 6C and 6D show the same information but in different forms. From the provided amplitude ratio and the known modulation scheme, the receiver can fill in all of the modulation states 630 according to the exhibited minimum branch amplitudes. Messages modulated in 16QAM, or other order of quadrature amplitude modulation, as well as BPSK and QPSK, can then be demodulated.

Figure 6E:
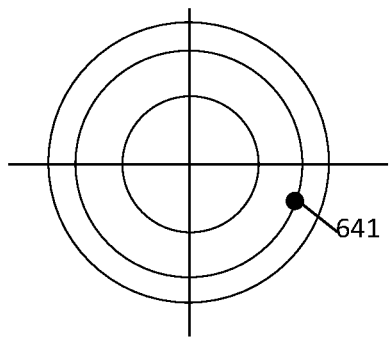
FIG. 6E is a phase chart showing another exemplary embodiment of a 1-point short-form pulse-amplitude demodulation reference, according to some embodiments.

FIG. 6E is a phase chart showing another exemplary embodiment of a 1-point short-form pulse-amplitude demodulation reference, according to some embodiments. As depicted in this non-limiting example, the demodulation reference includes a single reference element 641 positioned at a raw-signal phase of 18.4 degrees. For 16QAM, the receiver can calculate the maximum raw-signal amplitude as 1.340 times the observed amplitude of the raw signal of the reference element 641, and also the minimum raw-signal amplitude as 0.447 times the observed amplitude. Likewise, the receiver can calculate that the maximum branch amplitude is 0.948 times the observed amplitude, and the minimum branch amplitude is 0.316 times that amplitude, assuming the amplitude ratio (max/min) is 3.0, as is standard for 16QAM. As mentioned, the additive noise can be quantified by comparing the magnitude of the I-branch amplitude with three times the magnitude of the Q-branch amplitude. For higher orders, other ratios apply. Thus the intermediate raw amplitude level is the trigonometric sum of the minimum and maximum raw amplitudes in each case. From the single resource element of the 1-point demodulation reference, the receiver can calculate the maximum and minimum raw or branch amplitudes, and can fill in all of the modulation levels in a calibration set assuming either PAM or raw-signal amplitude-phase analysis, and can then demodulate the message with attenuation and receiver sensitivity effectively compensated, and with additive noise largely compensated.

Figure 6F:
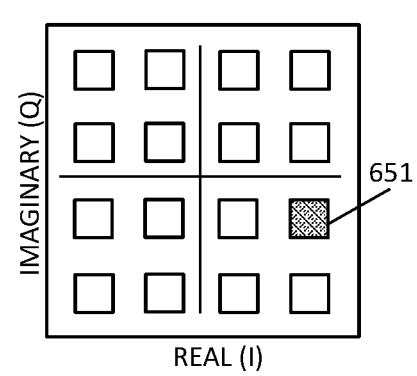
FIG. 6F is a constellation table showing another exemplary embodiment of a 1-point short-form pulse-amplitude demodulation reference, according to some embodiments.

FIG. 6F is a constellation table showing another exemplary embodiment of a 1-point short-form pulse-amplitude demodulation reference, according to some embodiments. As depicted in this non-limiting example, a single reference element 651 includes the maximum positive I-branch signal and the minimum positive Q-branch signal. The receiver can separate the I-branch and Q-branch signals, measure their branch amplitudes, and thereby determine the maximum and minimum branch amplitudes of the modulation scheme, which is 16QAM. The receiver can then fill in all of the predetermined branch amplitude levels of the modulation scheme by multiplying those values by plus or minus one. In addition, the receiver can calculate the raw-signal maximum, intermediate, and minimum amplitudes, and their phases, according to the trigonometric ratios of 16QAM in this case, or the appropriate ratios for higher order modulation schemes. The receiver can then fill in all of the raw-signal amplitude and phase levels in a second calibration set. The receiver can then demodulate a subsequent message, fully compensating for attenuation and receiver sensitivity and additive noise, by comparing each message element to the predetermined modulation levels in either the first or second calibration set, and thereby determine the message content, based on a demodulation reference occupying just a single resource element.

Figure 6G:
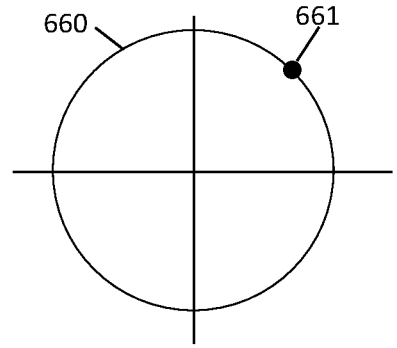
FIG. 6G is a phase chart showing an exemplary embodiment of a 1-point short-form pulse-amplitude demodulation reference for QPSK, according to some embodiments.

FIG. 6G is a phase chart showing an exemplary embodiment of a very short low-complexity demodulation reference such as a one-point short-form pulse-amplitude demodulation reference for QPSK, according to some embodiments. As depicted in this non-limiting example, the circle 660 represents the constant amplitude of the raw signal in this modulation scheme. The indicated state 661 is modulated at the single raw signal amplitude and at a phase of 45 degrees. The width of the amplitude levels is zero in this case, which informs the receiver that the modulation scheme is PSK and not QAM, and therefore all of the message elements should have the same raw signal amplitude. The receiver can fill in the calibration set by advancing the observed reference element 661 by steps of 90 degrees.

Figure 6H:
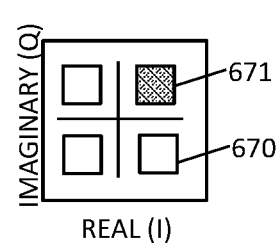
FIG. 6H is a constellation table showing an exemplary embodiment of a 1-point short-form pulse-amplitude demodulation reference for QPSK, according to some embodiments.

FIG. 6H is a constellation table showing an exemplary embodiment of a low-complexity demodulation reference such as a one-point short-form demodulation reference, according to some embodiments. As depicted in this non-limiting example, the table shows the four states 670 of QPSK as I-branch amplitude versus Q-branch amplitude, with one state 671 stippled, corresponding to the state 661 shown in the previous figure. The state 671 corresponds to the single positive I-branch amplitude level, multiplexed with the single positive Q-branch amplitude level. Thus the two charts of FIGS. 6E and 6F show the same information but in different forms. The receiver can fill in the predetermined branch amplitude levels (I and Q, positive and negative) based on the observed branch amplitudes in the single reference element 671. For improved precision, the receiver can average the I and Q branch amplitudes measured from the single reference element.

An advantage of the one-point short-form demodulation reference may be that it is very small, just one reference element, and thus can be added to messages with only a very slight increase in resource usage. Another advantage may be that it may be easy for receiver processors to use the short-form demodulation reference to demodulate messages, using the predetermined amplitude levels in the calibration set. Another advantage may be that distortions, in amplitude or phase or both, due to attenuation or receiver sensitivity, may be included in the I and Q branch amplitude values (or the raw signal amplitude and phase) exhibited in the single reference element, and therefore those distortions may be substantially canceled when the demodulation reference is used to demodulate a subsequent message. In addition, for certain versions of the one-point demodulation reference, the additive noise may be quantified and mitigated in the message demodulation.

Figure 7A:
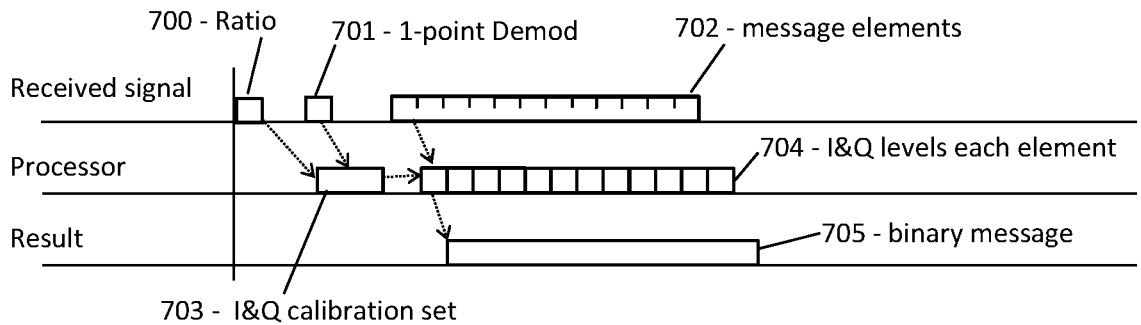
FIG. 7A is a sequence chart showing an exemplary embodiment of a process for demodulating a message using a one-point short-form pulse-amplitude demodulation reference, according to some embodiments.

FIG. 7A is a sequence chart showing an exemplary embodiment of a low-complexity procedure for providing and using a one-point short-form demodulation reference, according to some embodiments. A received signal is shown on the first line, a processor on the second line, and a result is shown on the third line. As depicted in this non-limiting example, an amplitude ratio 700, equal to the maximum branch amplitude level in the modulation scheme divided by the minimum, is initially provided (for example, by convention, or in system information files, or as an RRC message). A demodulation reference 701 is later received, in this case a one-point short-form demodulation reference 701, followed later by a message 702 which is to be demodulated. The short-form demodulation reference 701 is not time-synchronized with the message 702 in this case, other than to precede the message 702. In some embodiments, the amplitude-ratio message 700 may also indicate whether the short-form demodulation reference 701 exhibits the minimum or maximum amplitude level of the modulation scheme. In other embodiments, that amplitude information may be established by a system information message, or by convention, or otherwise. In each case, the processor can determine how to use the amplitude ratio 700 to calculate the other, non-exhibited, amplitude levels.

The processor then analyzes the sole reference element of the one-point short-form demodulation reference 701 using the provided amplitude ratio 700, and thereby determines the minimum branch amplitude level (if the maximum is exhibited in the demodulation reference), and completes the calibration set 703 with all the states of the modulation scheme and the single branch amplitude. In this example, the 1-point short-form demodulation reference includes the maximum positive I and maximum negative Q branch amplitude levels. Therefore the levels of the calibration set can compensate for additive noise in the message elements.

Then, the processor analyzes each resource element of the message 702, comparing each I and Q branch amplitude of each message element to the calibration set 703, and thereby assigns a modulation state 704 to each of the message elements 702. Then each amplitude and phase modulation level may be assigned a binary code, or other numerical code, and the entire message 702 can then be represented by a series of binary bits 705 by concatenating, or otherwise combining, the codes for each message element.

Figure 7B:
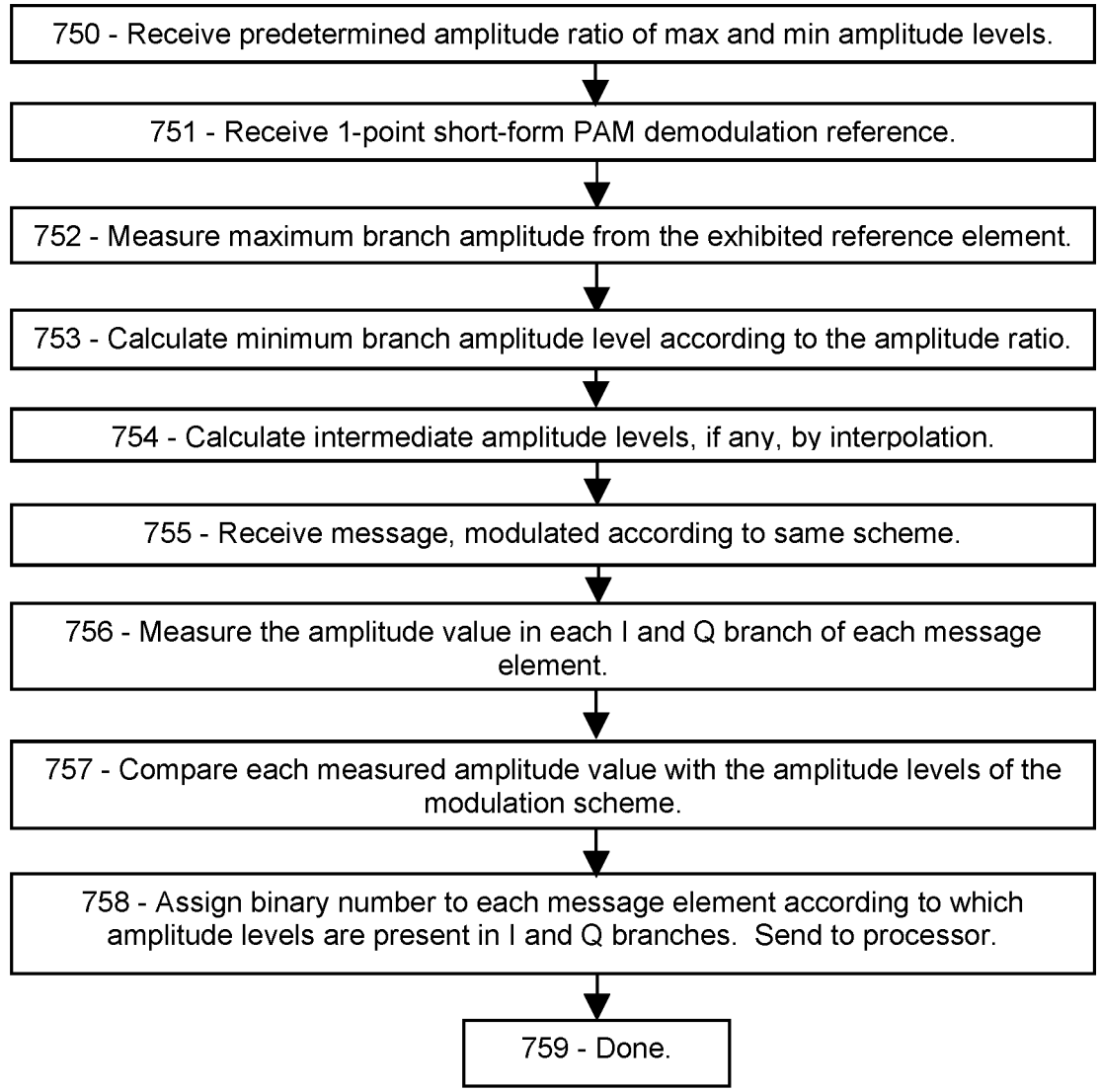
FIG. 7B is a flowchart showing an exemplary embodiment of a process for demodulating a message using a one-point short-form pulse-amplitude demodulation reference, according to some embodiments.

FIG. 7B is a flowchart showing an exemplary embodiment of a low-complexity procedure for using a demodulation reference, according to some embodiments. As depicted in this non-limiting example, a receiver compares elements of a message to calibrations based on a one-point short-form PAM demodulation reference, and thereby determines the modulation levels, in amplitude and phase, for each of the message elements.

At 750, the receiving entity either obtains or already knows the amplitude ratio, which is the ratio of the minimum to maximum branch amplitude levels of the modulation scheme that the message is modulated in. The amplitude ratio may be a standard convention and built-in for example, or it may be provided from an information source such as a network database, or provided as part of a system information message or a RRC message, or otherwise available to the receiving entity. If the modulation scheme is QPSK, the amplitude ratio is 1.0, and there is no amplitude modulation. At 751, the receiving entity receives a one-point short-form demodulation reference (such as that of FIG. 6A) and, at 752, measures the maximum positive I and Q branch amplitude values as exhibited in the short-form demodulation reference. At 753, the receiving entity calculates a minimum branch amplitude levels by dividing the maximum branch amplitudes by the amplitude ratio. At 754, the entity calculates any intermediate branch amplitude levels, if any, by interpolation. The receiver may also determine a raw signal amplitude and phase from the received demodulation reference signal, and may compare that determination to the branch amplitudes for consistency. The receiver may also compare the I and Q branch amplitudes to reveal other inconsistencies. The receiver may average the I and Q branch amplitudes for improved accuracy, according to some embodiments. For example, the receiver may separate the I and Q branches of the single demodulation reference element, and measure the I branch amplitude and Q branch amplitude. Then, the receiver may demodulate the message using those branch amplitude values, or the receiver can average the two branch amplitude values and use that average for both the I and Q branch demodulation of each message element. An advantage of using different branch amplitudes for the message I and Q demodulation may be to compensate for phase-dependent interference, which can affect the two branch amplitudes differently. An advantage of averaging the two branch amplitude values may be to obtain a more accurate value.

At 755 the receiver receives the message to be demodulated. At 756, the receiver separates the I and Q branches for each message element and measures their branch amplitudes. At 757, the receiver compares each branch amplitude value to the amplitude levels in the calibration set and determines the closest modulation state. At 758, the receiver assigns a binary representation to each message element based on its best-match modulation state, and provides the result to an interpreter processor, and is done at 759.

An advantage of providing a one-point short-form demodulation reference may be that it is very short, just one reference element. Another advantage may be that the maximum or minimum positive or negative branch amplitude levels can be explicitly provided in the short-form pulse-amplitude demodulation reference, from which the other levels can be calculated according to the known amplitude ratio. Another advantage may be that attenuation and receiver sensitivity may be compensated when the received reference values are used to demodulate a subsequent message. Another advantage may be that the receiver can measure the amplitude and phase of the raw signal and compare those values to the branch amplitudes to reveal complex interference or inconsistencies, according to some embodiments. Another advantage may be that, if the demodulation reference includes a maximum branch amplitude in one of the branches and a minimum branch amplitude in the other branch, the receiver can determine the maximum and minimum branch amplitude levels from those measurements, without the need for an amplitude ratio or other convention, according to some embodiments. Another advantage may be that the magnitudes of the branch amplitudes may indicate the net attenuation and receiver sensitivity of the demodulation reference, enabling demodulation of the subsequent message. Another advantage may be that, if both positive and negative branch amplitudes are exhibited in the demodulation reference, the additive noise or interference can be quantified by the difference, and thereby mitigated in the subsequent message elements, according so some embodiments.

Figure 8A:
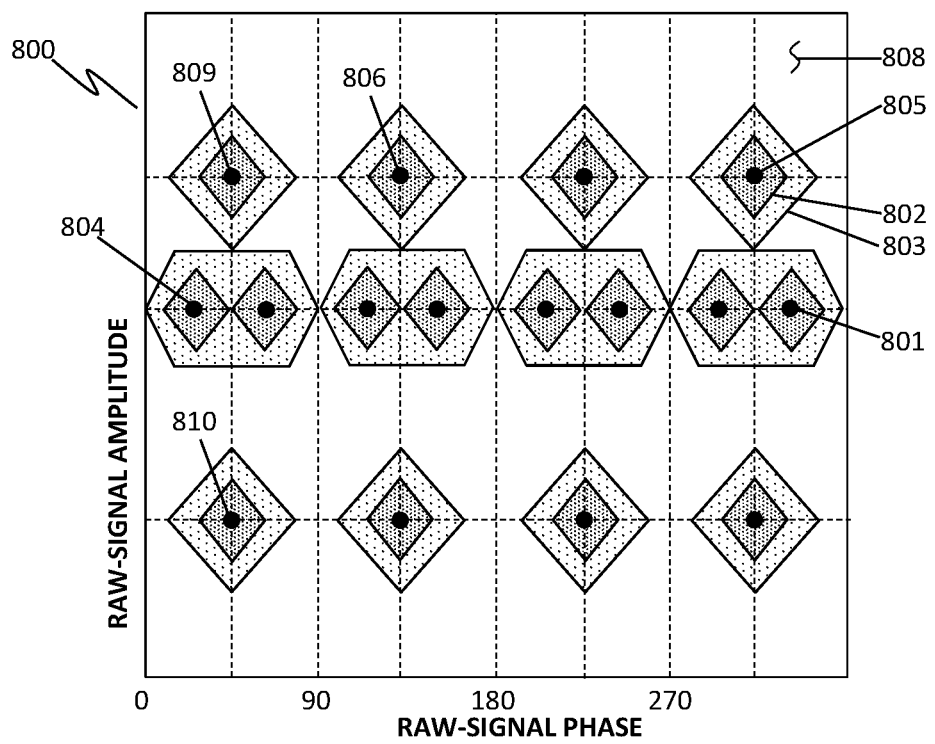
FIG. 8A is a modulation table showing an exemplary embodiment of states of a pulse-amplitude modulation scheme displayed according to the phase and amplitude of the raw signal, according to some embodiments.

FIG. 8A is a modulation table showing an exemplary embodiment of a pulse-amplitude modulation scheme, plotted according to the phase and amplitude of the raw signal, according to some embodiments. As depicted in this non-limiting example, a modulation table 800 is an array of modulation states of a modulation scheme, arranged according to the phase and amplitude of the as-received raw signal. The amplitude and phase of the raw signal may provide information about noise and interference more readily and/or more precisely than amplitude analysis of the I and Q branches of PAM, and comparison of the two demodulation procedures may reveal faulted message elements, in some embodiments.

The depicted modulation scheme in this case is 16QAM, transmitted according to pulse-amplitude modulation, and the raw signal is then analyzed by the receiver according to classical amplitude and phase analysis of the raw signal. Each modulation state is depicted as a dot 801. (The peculiar and non-uniform distribution of states 801 in this chart is due to the effects of trigonometrically adding two sinusoidal waves at different phases and amplitudes.) Although each raw signal modulation state 801 is deterministically determined by the I and Q branch amplitudes, and vice-versa, the two demodulation schemes may have different sensitivities or measurement uncertainties for actual noise and interference, particularly regarding phase errors which PAM does not measure. In addition, none of these measurements is perfect, and none of the theoretical conclusions is without assumptions. Therefore, the raw signal amplitude and phase may provide distinct or at least improved information about the proper demodulation value of each message element, and may reveal which message elements are faulted in case the message is determined to be corrupted. Accordingly, in some embodiments, the demodulation reference and each message element may be analyzed by both methods, including amplitude determination of the separate I and Q branches, and amplitude-phase analysis of the raw signal. Those results may be combined by, for example, allocating a message element to a "suspicious" category if the message element has poor modulation quality, by either PAM analysis or raw signal amplitude-phase determination, and especially if the two procedures indicate different modulation states for the same message element.

The chart shows, around each state 801, a "good-modulation" zone 802 in dark stipple and a larger "marginal-modulation" zone 803 in light stipple, while the exterior space 808 is relegated to a "bad-modulation" zone. Message elements in which the raw signal amplitude and phase occur in the marginal 803 or bad modulation 808 zones may thereby reveal which message elements in a corrupt reception are at fault. In some embodiments, the receiver may test each message element according to the amplitude and phase properties of the raw signal, then separate the I and Q branches and test each of them for agreement with one of the predetermined branch amplitude levels, and thereby flag a message element as suspicious if the message element appears in the bad or marginal modulation zone according to either the raw signal analysis or the branch analysis. In addition, the message element is likely faulted if the two demodulation techniques produce inconsistent results, in which PAM indicates a different modulation state than amplitude-phase demodulation.

In addition, the receiver may apply a similar check to the elements of a demodulation reference, such as a four-point or two-point or one-point short-form pulse-amplitude demodulation reference. For example, the receiver can determine whether the raw signal amplitude and phase values of each demodulation reference element are consistent with their I and Q branch amplitudes. In addition, the receiver may flag as suspicious a demodulation element that exhibits a raw signal amplitude or phase that differs substantially from the same parameters in a previous demodulation reference, and may thereby detect a sudden change in backgrounds. The receiver may reveal suspicious message elements or demodulation reference elements that may be missed if tested using only a single analysis type.

The chart also shows a particular state 805, with maximum raw-signal amplitude and 315-degree raw-signal phase. This state 805 corresponds to the sum-signal wave 103 of FIG. 1A.

The chart also shows another particular state 806, with maximal raw-signal amplitude and 135-degree raw-signal phase. This state 806 corresponds to the one-point demodulation reference 601 of FIG. 6A.

The chart also shows two more states, 809 and 810, corresponding to the states 422 and 423, respectively, of FIG. 4C.

The chart also shows another state 804 with mixed amplitude and a phase of just 18.4 degrees. This corresponds to the one-point short-form pulse-amplitude demodulation reference of FIG. 6E or 6F.

A demodulation reference with a single reference element modulated with the maximum branch amplitude level in one branch and the minimum branch level in the other branch can therefore determine both levels by separating the two branches, measure the maximum and minimum branch amplitudes therein, and then calculate all of the other PAM amplitude levels of the modulation scheme from those values. In addition, the receiver can also calculate the raw signal amplitude and phase levels from the branch amplitudes and the raw signal phase. Specifically, referring again to state 804, the maximum raw signal amplitude level is equal to 1.414 times the I-branch amplitude, and the minimum raw signal amplitude is 1.414 times the Q-branch amplitude of that state, and similar ratios exist for the other mixed-amplitude states. In addition, the intermediate raw signal amplitude is already provided by the as-received demodulation reference signal, with no further analysis needed other than measuring the received signal amplitude. In addition, the receiver can compare each message element's raw signal amplitude and phase to the amplitude and phase levels calculated from the demodulation reference such as that of FIG. 6E or 6F, and thereby determine inconsistencies between the PAM demodulation and the raw signal demodulation, indicating some kind of phase-dependent noise or other error. Faulted message elements, for example, may be revealed by such inconsistencies.

Figure 8B:
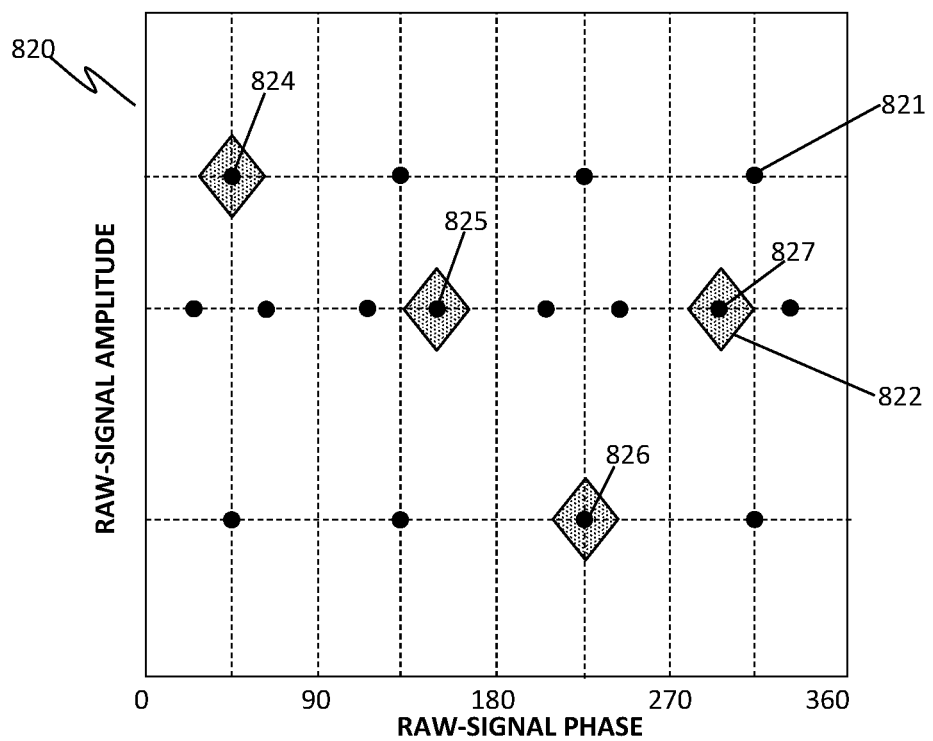
FIG. 8B is a modulation table showing an exemplary embodiment of a four-point demodulation reference modulated according to a pulse-amplitude modulation scheme and displayed according to the phase and amplitude of the raw signal, according to some embodiments.

FIG. 8B is a modulation table 820 showing an exemplary embodiment of a four-point demodulation reference modulated according to a pulse-amplitude modulation scheme and displayed according to the raw-signal phase and amplitude, according to some embodiments. As depicted in this non-limiting example, the modulation states 821 are shown as dots, with the raw signal amplitude vertical and the raw signal phase horizontal. Certain states are surrounded by a good-modulation zone 822 in dark stipple. These states 824, 825, 826, 827 correspond to the same states 224, 225, 226, 227 of FIG. 2C, or the corresponding states 234, 235, 236, 237 of FIG. 2D. Thus the demodulation reference elements of a four-point short-form pulse-amplitude demodulation reference can be reanalyzed according to the raw signal phase and amplitude, and displayed as shown in this figure. Each of the short-form demodulation reference examples discussed above, as well as other demodulation references for other modulation schemes, may be reanalyzed according to the raw signal properties in a similar way, potentially revealing otherwise unseen noise or interference or inconsistencies or other problems that may cause message demodulation errors, according to some embodiments.

Figure 9:
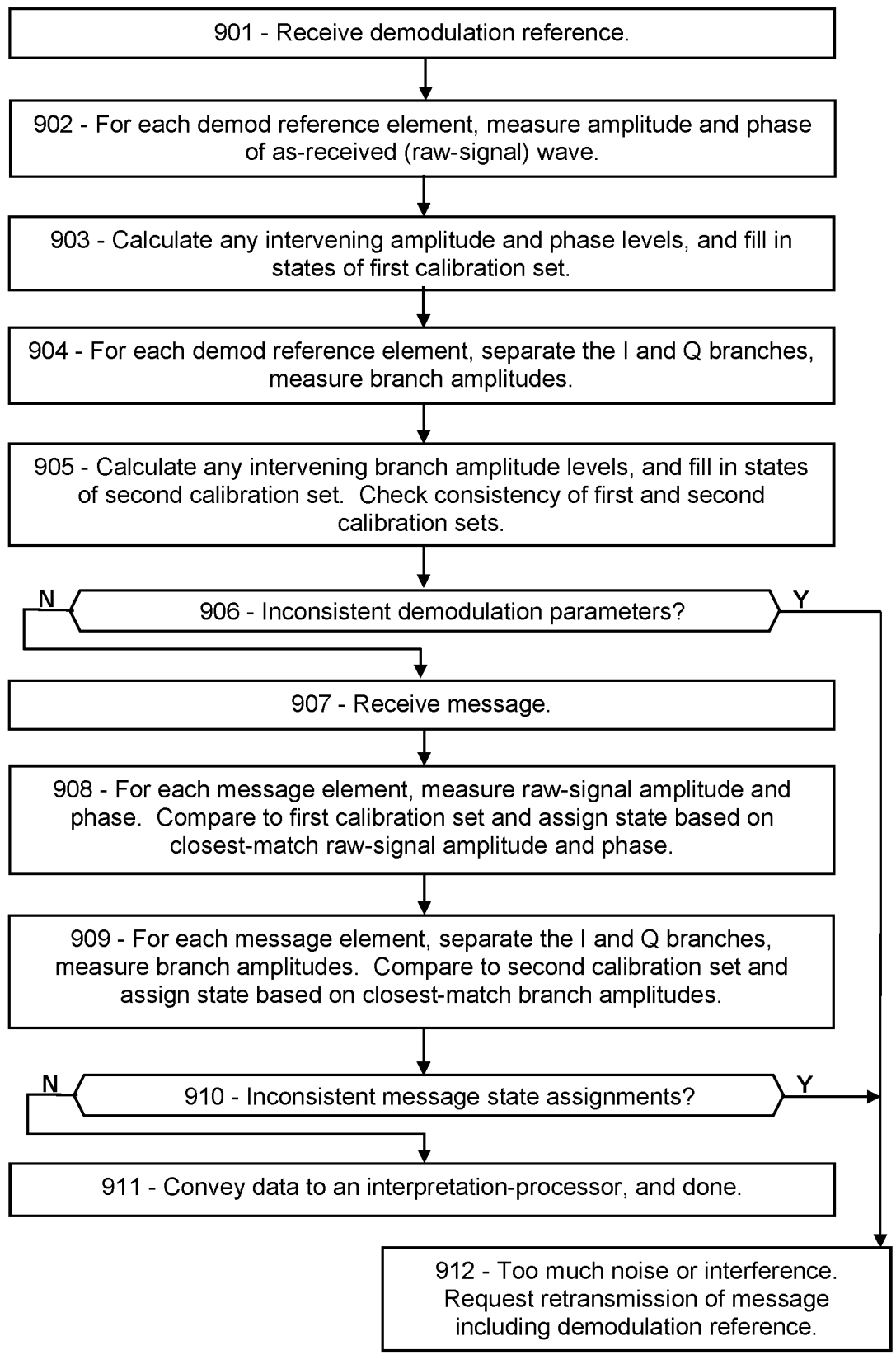
FIG. 9 is a flowchart showing an exemplary embodiment of a process for checking a demodulation reference, which is configured in pulse-amplitude modulation and analyzed according to the phase and amplitude of the raw signal, according to some embodiments.

FIG. 9 is a flowchart showing an exemplary embodiment of a process for checking a demodulation reference, which is configured in pulse-amplitude modulation and analyzed according to the phase and amplitude of the raw signal, according to some embodiments. As depicted in this non-limiting example, at 901 a receiver receives a demodulation reference, such as one of the short-form pulse-amplitude demodulation references disclosed herein, or another type. At 902, the receiver measures the raw signal amplitude and phase for each reference element of the demodulation reference, and at 903 calculates any further intervening amplitude and phase levels of the modulation scheme by, for example, interpolation. The receiver then fills in the amplitude and phase levels of a first calibration set representing the states of the modulation scheme in amplitude and phase modulation of the raw signal.

At 904, the receiver re-analyzes the elements of the demodulation reference, this time separating the I and Q branches and measuring the branch amplitudes. At 905, the receiver calculates any intervening branch amplitudes and fills in the amplitude levels of a second calibration set including all of the branch amplitudes of the modulation scheme. At 906, the receiver checks for inconsistencies between the state assignments of the first and second calibration sets, which may indicate pathological interference or measurement errors or phase errors or other problems, and if so, drops to 912 and requests a retransmission.

At 907, the receiver receives a message and, at 908, measures the raw signal amplitude and phase of each message element. The receiver determines the modulation state by selecting the closest amplitude and phase levels of the first calibration set. At 909, the receiver re-analyzes the message elements by separating the I and Q branches and measuring each branch amplitude, and then determines the modulation state by selecting the closest branch amplitude levels in the second calibration set. At 910, the receiver checks for inconsistent state assignments by the two demodulation procedures, and if so, drops to 912 to request a retransmission of the message as well as the demodulation reference. If no such errors are uncovered, then at 911 it conveys the message data, representing the modulation states of each message element, to an interpretation processor and is done.

In some embodiments, the receiver may determine that one or a small number of the message elements are faulted according to the consistency check, and instead of requesting a retransmission, may attempt to recover the message by altering the state assignments of the likely faulted message elements. For example, the receiver can alter the assigned states of the suspicious elements to other adjacent states (differing by one branch amplitude level, or by one raw signal amplitude level, or one raw signal phase level, for example), and if that is not successful, to the other states of the modulation scheme, while testing each candidate message against an error-detection code (such as a CRC or other error code) which may be embedded in the message. If the message, with such an altered state assignment, then agrees with the error-detection code, the message has been recovered. If all of the feasible alterations fail to agree with the error-detection code, then the receiver may request the retransmission.

By checking the signal properties according to two different demodulation schemes, the receiver may detect faults and/or identify the likely faulted message elements, due to the different properties and distortion sensitivities of the two demodulation schemes, according to some embodiments.

Figure 10A:
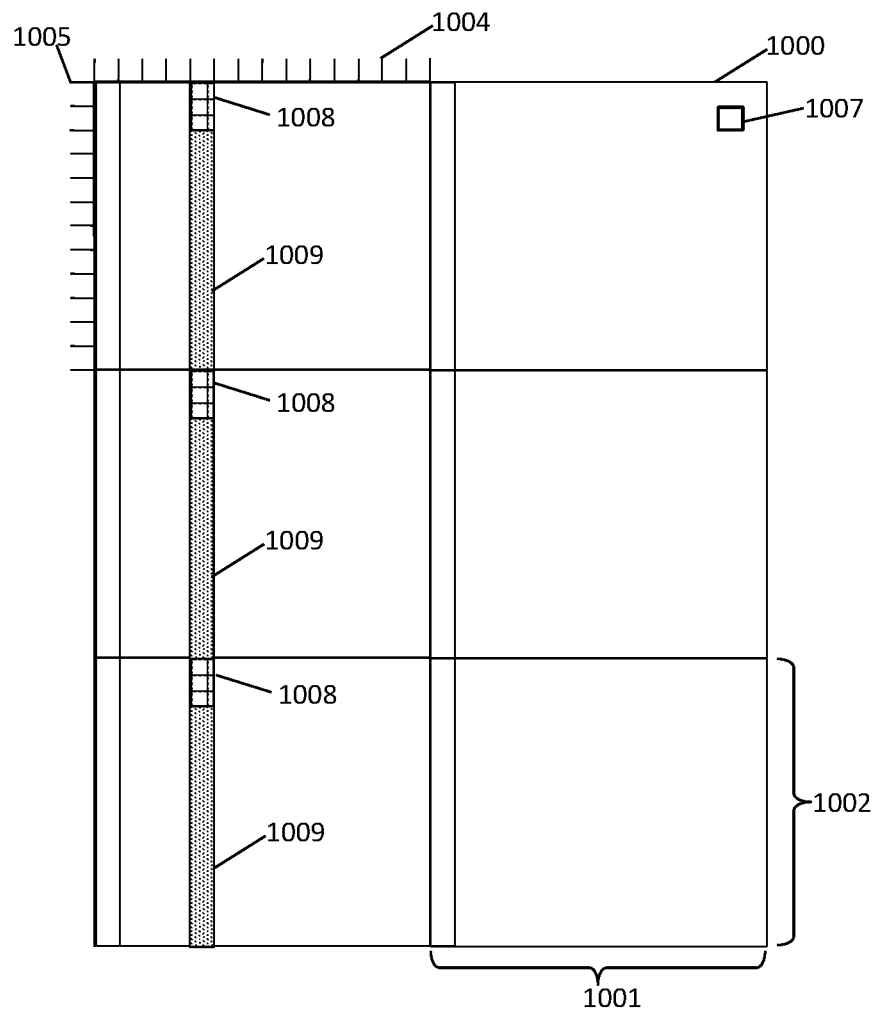
FIG. 10A is a schematic showing an exemplary embodiment of a resource grid with two-point short-form pulse-amplitude demodulation references interspersed within a message, according to some embodiments.

FIG. 10A is a sketch showing an exemplary embodiment of a resource grid 1000 according to some embodiments. One slot is indicated as 1001 and one resource block as 1002. Symbol times are marked as 1004 and subcarriers as 1005. A single resource element is shown as 1007. The first symbol time of each slot is outlined. As depicted in this non-limiting example, a message 1009, shown in stipple, is frequency-spanning in the fifth symbol period. Demodulation references 1008, shown in grid hatch, are two-point short-form pulse-amplitude demodulation references in this case. Each demodulation reference 1008 occupies just two resource elements, inserted among the message elements. In this case, the demodulation references appear in the first two subcarriers of the frequency-spanning message, in each resource block, throughout the message 1009. Each two-point short-form demodulation reference 1008 includes sufficient amplitude and phase information to update all of the amplitude and phase levels of the calibration set in the presence of current interference, and thereby improves the interference mitigation of the message 1009. Importantly, the average distance (in frequency) from each message element to the closest demodulation reference is only 3 subcarriers, yet the additional resource usage is less than 17%. The figure thus demonstrates that inserting a two-point short-form demodulation reference 1008 in each resource block of a frequency-spanning message 1009 provides recalibrations of modulation levels close to the message elements for improved interference mitigation, yet causes only a small increase in resource and energy usage, according to some embodiments.

Figure 10B:
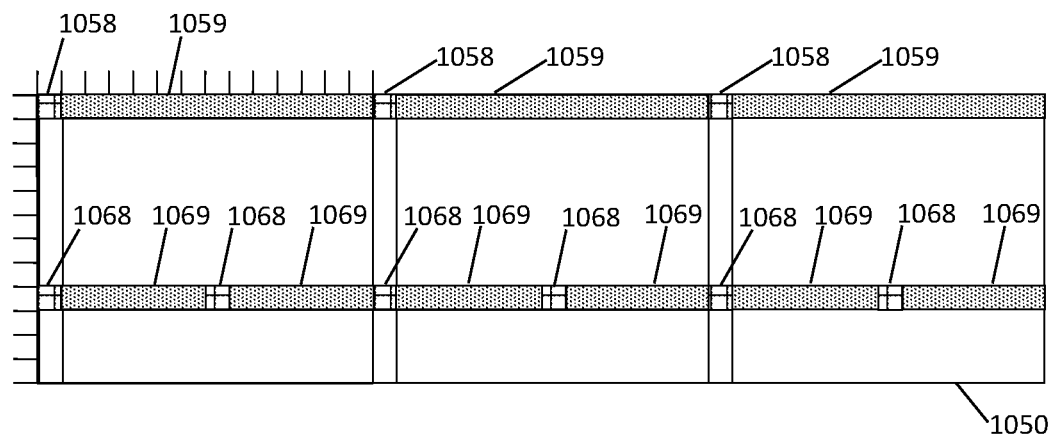
FIG. 10B is a schematic showing an exemplary embodiment of a resource grid with one-point short-form pulse-amplitude demodulation references interspersed within two messages, according to some embodiments.

FIG. 10B is a sketch showing an exemplary embodiment of a resource grid 1050 according to some embodiments. As depicted in this non-limiting example, the resource grid 1050 includes three slots and one resource block. Two time-spanning messages are shown in subcarriers 1 and 9. Each message is interspersed with one-point short-form pulse-amplitude demodulation references. A first message 1059 includes a one-point demodulation reference 1058 in the first symbol period of each slot. The one-point demodulation references 1058 thereby provide sufficient modulation information to refresh the calibration set on the time scale of one slot, at a cost of only about 7% of the message resource elements.

The figure also shows a second message 1069 in the ninth subcarrier. The second message 1069 is interspersed by one-point short-form pulse-amplitude demodulation references 1068 in every seventh symbol time, thereby providing interference mitigation on a time scale corresponding to a half-slot, for a resource usage increase of about 14%. The average distance from a message element to the nearest demodulation reference is reduced to 2 symbol periods in the depicted example. Such close proximity between message elements and demodulation references thereby provides further improved interference mitigation.

The improved local demodulation information provided in the one-point short-form demodulation references 1008 or 1058 or 1068 may be employed in various ways. In one embodiment, the receiver may be configured to demodulate each portion of the message 1009 or 1059 or 1069 according to the updated modulation levels provided by the immediately preceding demodulation reference 1008 or 1058 or 1068. In that case, each portion of the message 1009 or 1059 or 1069 is demodulated according to the immediately preceding demodulation reference 1008 or 1058 or 1068.

In a second embodiment, the receiver may be configured to demodulate each portion of the message 1009 or 1059 or 1069 by averaging the two short-form demodulation references 1008 or 1058 or 1068 adjacent to that message portion, that is, by averaging the corresponding modulation levels in the demodulation references 1008 or 1058 or 1068 immediately preceding and immediately following each message portion 1009 or 1059 or 1069. For example, the receiver may average the I or Q branch amplitude levels in the preceding and following demodulation references 1008 or 1058 or 1068, and then may demodulate the intervening message portion according to those average amplitude levels. By accounting for interference at both ends of each message portion, the receiver may mitigate variable interference more accurately than using just the preceding demodulation reference to demodulate the message portion.

In a third embodiment, the receiver may be configured to calculate a weighted average for each amplitude and phase level in the modulation scheme. The weighted average may be obtained by weighting the immediately preceding and immediately following short-form demodulation references. The weighting may be according to the distance, in time or frequency, between each message element and the two proximate demodulation references. For example, the calibration set for each message element may be calculated by interpolating between the preceding and following demodulation references. For example, the receiver may demodulate a particular message element that is in the middle of the message portion (and hence equidistant from the preceding and following demodulation references) by weighting the preceding and following values equally. For the first message element in the message portion, on the other hand, the preceding demodulation reference may be weighted heavily (since it is closer) and the following demodulation reference may be weighted only lightly. Likewise, for the last message element in a message portion, the receiver may heavily weight the following demodulation reference and lightly weight the preceding one. In this way, the receiver may interpolate between the preceding and following demodulation reference, and thereby calculate a distance-weighted calibration set associated with each message element according to its distance from the preceding and following demodulation references, and then may demodulate each element of the message using that weighted average. The resulting demodulation may thereby mitigate variable interference more effectively than a non-weighted average.

In a fourth embodiment, the receiver may be configured to average a plurality of the preceding demodulation references, and optionally one or more of the following demodulation references as well, in order to obtain a more accurate determination of the levels of the modulation scheme. Averaging multiple demodulation references may provide a more precise determination of the correct demodulation levels when there is random noise in the receiver, such as electronic noise, which is then amplified in the amplifier of the receiver. In some cases, noise may be relatively stable or slowly changing in time or frequency, in which case the averaging of several of the short-form demodulation references may provide a more precise determination of the levels despite measurement errors.

Interference, on the other hand, is generally highly structured in frequency and time because it is likely due to competing messages from adjacent cells, or from electrical machinery or the like. Averaging multiple short-form demodulation references may be counter-productive when frequency-rich interference is larger than noise, because such interference generally changes rapidly in time and/or in frequency, thereby likely changing shorter than the averaging time (or averaging frequency band) of the short-form demodulation references, then those averaged demodulation levels are likely to be incorrect when applied to the subsequent message elements. Therefore, when interference is greater than noise, the weighted-average embodiment described above, involving a weighted average between two short-form demodulation references that precede and follow the message section, may provide better mitigation and fewer message faults, than averaging multiple preceding and multiple following demodulation references. In contrast, when noise is greater than interference (and is sufficiently stable in time or frequency), then the averaging of multiple short-form demodulation references may provide a more accurate set of level values than a single short-form demodulation reference.

In some embodiments, a formula may be provided to assist user devices and base stations in deciding which type of averaging is expected to result in fewest message faults, according to the current conditions. Conditions that may affect the choice may include factors such as the traffic density, the prior fault rate, the average noise amplitude, the maximum range of interference fluctuations, and the like. The formula may be based on machine learning and/or artificial intelligence. The formula may be configured to provide, as output, the most suitable type of averaging or interpolating of short-form demodulation reference values, according to the current network and background and messaging conditions. For example, if noise dominates, the formula may recommend averaging multiple short-form demodulation references to obtain a more accurate value of each modulation level, whereas if interference dominates, the formula may recommend not averaging at all, or else using the weighted averaging based on distance from the preceding and following short-form demodulation references. In this way, the formula may assist the receiver in mitigating both electronic noise and fluctuating interference while minimizing message faults under both conditions.

In some embodiments, a short-form demodulation reference may indicate the beginning and/or ending of a message. User devices often have difficulty identifying downlink control messages due to the large number of possible positions and sizes of the messages. User devices are expected to test all of the possible combinations of starting location and length of possible downlink control messages by unscrambling each candidate message and comparing to an included error-detection code, for example. The short-form demodulation reference can greatly simplify this process by indicating, with a characteristic pattern of reference elements, the beginning and/or ending of a message. For example, a two-point short-form demodulation reference having the maximum branch amplitudes in its first reference element and the minimum branch amplitudes in its second reference element, can be placed at the start of the message, to indicate where the message begins. The end of the message may be indicated by another, optionally different, pattern of short-form demodulation reference, such as the minimum branch amplitudes followed by the maximum branch amplitudes. The receiver may be configured to search for the beginning and ending patterns among the received elements, and thereby identify messages, or at least greatly reduce the number of candidate messages that the receiver needs to test. In addition, the two-point short-form demodulation references at the beginning and ending of the message may assist in demodulating the message.

An advantage of providing multiple short-form pulse-amplitude demodulation references, such as one-point or two-point short-form demodulation references, interspersed among portions of a message, may be that the modulation levels of the message elements may be recalibrated frequently thereby, resulting in interference mitigation on short time and frequency scales. In a dense radio environment, with large numbers of devices transmitting on various frequencies at various times, message faults may be reduced by providing demodulation recalibrations in close proximity to the message elements they are intended to demodulate. Use of a short demodulation format, such as a short-form demodulation reference occupying just one or two resource elements, may minimize the additional energy consumed and electromagnetic background generated. Another advantage may be that distortions, in amplitude or phase or both, due to noise or interference, may be included in the amplitude and phase values of the reference elements, and therefore those distortions may be canceled in a subsequent message demodulated using those reference values.

Numerous versions of short-form demodulation references are disclosed herein, each with different properties, and many others are possible using the mathematical relationships discussed, or other equivalent mathematical relationships. Selecting which one to use in any messaging situation is a complex problem. An algorithm may be developed to select an appropriate or optimal type of short-form demodulation reference depending on wireless conditions, the message, capabilities of the transmitter and receiver, current traffic conditions, QoS requested, and many other considerations. A 4-point short-form demodulation reference provides more information and redundancy than the 2-point version, while the 1-point version is very short but requires that the amplitude ratio be predetermined. Other-point versions (3, 6, etc. points) are also possible. In some applications, keeping the message short may be paramount, whereas in other applications the additional redundancy and reliability of the 4-point version may be preferred. Some applications may prioritize low latency, while others may require high reliability, and still others may need reduced complexity. Different versions may be optimal for different modulation schemes, such as those with and without amplitude modulation. The transmitting processor may select the size and format according to each message situation. Alternatively, a convention may be established favoring one of the short-form demodulation versions as a default for all situations. As a further option, various versions may be recommended according to current parameters such as the energy density and time-frequency properties of current interference.

As a further option, artificial intelligence (AI) or machine learning may be used to prepare an algorithm, which is configured to select a particular demodulation reference version according to the messaging situation. To prepare such an algorithm, a large number of messaging events may be tracked (or recorded or analyzed) by one or more base stations (or core networks or other networking entities). The data may be analyzed by an AI structure such as a neural net, which takes in input parameters and calculates output values according to a number of internal variables which are adjustable. For example, the input parameters may include the current traffic density, number of actively communicating user devices, average size of messages, amount and type of external interference, the size and type of short-form demodulation reference employed in various messaging situations, and the QoS requirements related to each message, as well as a measure of the resulting network performance. The AI structure may also take as input the expected costs, such as resource element usage, delays, subsequent message failures, and the like. The AI structure may be configured to generate outputs such as a prediction of the subsequent network performance, which may then be compared to the measured network performance, to judge how accurate the predictions are. Alternatively, the outputs may include a suggested format of a short-form demodulation reference according to current conditions, which users and base stations may then employ. The AI structure may also compare the costs and advantages of the standard 5G/6G DMRS reference to the various formats of short-form demodulation references, and may thereby address a greater range of use cases. The variables may then be varied to optimize, or at least improve, the accuracy of the outputs or predictions.

An algorithm may be derived from the AI structure when the outputs have achieved a sufficient accuracy. The algorithm may be the AI structure itself, or the AI structure condensed by freezing the variables and excising any inputs and internal functions that have demonstrated little effect on the outputs, for example. Alternatively, an algorithm may be prepared to mimic the AI outputs according to the input values, but using a different and preferably simpler calculation technique, such as an analytic function or a computer program or an interpolation table, among many other envisioned calculation options. The algorithm may then be provided to base stations and user devices so that they may make optimal, or at least improved, decisions regarding demodulation references according to the situation.

The algorithm may also provide assistance to the transmitter, in deciding which type of short-form demodulation reference to use, and how often to include them in the message. For example, the algorithm may take as input a measure of the interference levels observed at the transmitter, other measures of interference measured by the receiving entity and communicated to the transmitter, a previously-determined level of noise in the transmission process, a previously-determined level of noise in the receiver and communicated to the transmitter, the spectrum of variations in noise or interference versus time or frequency or both, among other possible considerations. The algorithm may further include receiver preferences, such as requiring high reliability rather than low latency, or vice versa. The length of the message, the number of competing users, the expected traffic density and other network parameters may also contribute to the algorithm's determination.

Due to the potentially large number of inputs and adjustable variables in the model, and the very large amount of training data likely needed for convergence of the model, the AI structure is preferably prepared in a supercomputer. The supercomputer may be a classical semiconductor-based computer, with sufficient speed and thread count and processor count to perform the model training in a feasible amount of time. Alternatively, the supercomputer may be a quantum computer having "qbits" or quantum bits as its working elements. Quantum computers may provide special advantages to solving AI models because they can very rapidly explore a complex terrain of values, such as the highly interrelated effects of the various inputs on the output results. Therefore, the systems and methods include a quantum computer programmed to include an AI structure and trained on network performance data and on input parameters including interference and noise parameters, message parameters, and the like as discussed above.

As a further option, a wireless standards committee may select one of the short-form demodulation reference versions as a default standard. The selection may be based, at least in part, on the artificial intelligence or machine learning structure results or the algorithm derived from it.

For a handy universal default, the embodiment of FIG. 4A or 4B, a two-point short-form pulse-amplitude demodulation reference showing the maximum positive and minimum negative branch amplitude values in the I-branch and Q-branch amplitudes, is offered as an advantageous candidate for such standardization, because the receiver can calculate the remaining branch amplitude levels of the modulation scheme according to the exhibited branch amplitudes, according to some embodiments. The 2-point demodulation reference can mitigate additive noise and interference according to the exhibited amplitudes. All of the branch amplitude levels of the modulation scheme can be determined from the 2-point short-form pulse-amplitude demodulation reference using low-complexity logic and arithmetic, as described. The default short-form demodulation reference can then be transmitted periodically, or prepended to messages, or prepended and appended to messages, or interspersed multiply within longer messages.

As another possible advantage, the 2-point short-form demodulation reference, or other default, when prepended to a message, may thereby indicate exactly where the message begins, thereby greatly simplifying detection of incoming messages. For example, the receiver can scan the active bandwidth for the characteristic code of the short-form demodulation reference, such as (0100) representing the maximum and minimum positive branch amplitudes. For specificity, the same demodulation reference may be repeated, such as (0100 0100). The end of the message may be indicated by an ending configurations such as (0001), indicating the minimal positive I-branch and maximal positive Q-branch amplitudes. By finding those characteristic patterns, the receiver may determine the starting and ending points of the message. In 5G and 6G, it is generally difficult for user devices to determine the starting point of a control message, absent such a characteristic initial code. In addition, for the two-point or four-point versions, the orientation of the reference elements, as time-spanning or frequency-spanning, thereby indicates whether the subsequent message is time-spanning or frequency-spanning. For example, a sidelink message may be time-spanning or frequency-spanning according to the transmitting entity's preference. In addition, the short-form demodulation reference may be advantageously employed on low-complexity or legacy channels as well as high-performance managed channels of 5G/6G, thereby providing compact and easy-to-use modulation calibration for each message. Moreover, the small size of the default short-form demodulation reference may be an enabling factor for agile interference mitigation in noisy environments, because the short short-form demodulation references may be placed liberally within messages at low cost, especially in regions with interference problems.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that may be seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

What is claimed is:

1. A method for demodulating a wireless message, the message comprising message elements, each message element modulated according to a modulation scheme, the modulation scheme comprising integer Nlevel predetermined amplitude levels, Nlevel greater than or equal to two, the method comprising:
   receiving a demodulation reference comprising integer Nref reference elements, Nref less than or equal to four;
   extracting, from each reference element, an I-branch signal having an I-branch amplitude, and a Q-branch signal having a Q-branch amplitude, the I-branch signal phase-shifted relative to the Q-branch signal;
   determining, based at least in part on the Nref I-branch amplitudes and the Nref Q-branch amplitudes, the Nlevel predetermined amplitude levels of the modulation scheme; and demodulating each message element according to the predetermined amplitude levels.

2. The method of claim 1, wherein the demodulation reference and the wireless message are transmitted according to 5G technology.

3. The method of claim 1, further comprising:
calculating one or more intermediate amplitude levels, each intermediate amplitude value comprising one of the predetermined amplitude levels, wherein each intermediate amplitude value is distinct from all of the I-branch amplitudes and all of the Q-branch amplitudes.

4. The method of claim 1, further comprising:
extracting, from each message element, a first branch signal and a second branch signal, the second branch signal phase-shifted relative to the first branch signal;
measuring, according to the first branch signal, a first amplitude value, and determining which of the predetermined amplitude levels most closely matches the first branch amplitude value; and
measuring, according to the second branch signal, a second amplitude value, and determining which of the predetermined amplitude levels most closely matches the second branch amplitude value.

5. The method of claim 4, further comprising:
associating, with each predetermined amplitude level, a distinct code or number;
selecting a first code or number associated with the predetermined amplitude level most closely matching the first amplitude value;
selecting a second code or number associated with the predetermined amplitude level most closely matching the second amplitude value; and
concatenating the first code or number with the second code or number.

6. The method of claim 5, further comprising:
for each message element, receiving a raw signal comprising a received signal prior to extraction of the I-branch and Q-branch signals;
measuring a raw signal amplitude and a raw signal phase of the raw signal;
determining, according to the raw signal amplitude and phase, a particular modulation state of the modulation scheme; and
comparing the particular modulation state with the concatenated first and second codes or numbers.

7. The method of claim 1, wherein:
the modulation scheme includes a minimum positive predetermined amplitude level and a maximum positive predetermined amplitude level;
the demodulation reference comprises exactly two reference resource elements;
one of the reference resource elements comprises a first I-branch and a first Q-branch, both the first I-branch and the first Q-branch modulated according to the minimum positive predetermined amplitude level; and
one of the reference resource elements comprises a second I-branch and a second Q-branch, both the second I-branch and the second Q-branch modulated according to the maximum positive predetermined amplitude level.

8. The method of claim 1, wherein:
the modulation scheme includes a maximum negative predetermined amplitude level and a maximum positive predetermined amplitude level;
the demodulation reference comprises exactly two reference resource elements;
one of the reference resource elements comprises a first I-branch and a first Q-branch, both the first I-branch and the first Q-branch modulated according to the maximum negative predetermined amplitude level; and
one of the reference resource elements comprises a second I-branch and a second Q-branch, both the second I-branch and the second Q-branch modulated according to the maximum positive predetermined amplitude level.

9. The method of claim 1, wherein:
the predetermined amplitude levels include a maximum positive amplitude level and a minimum positive amplitude level;
an amplitude ratio equals the maximum positive amplitude level divided by the minimum positive amplitude level;
the demodulation reference comprises exactly one reference resource element;
the one reference resource element comprises a first branch signal and a second branch signal, the first branch signal phase-shifted relative to the second branch signal;
and the method further comprises:
if the first branch signal and the second branch signal are both modulated according to the maximum positive amplitude level, determining the minimum positive amplitude level by dividing the maximum positive amplitude value by the amplitude ratio;
if the first branch signal and the second branch signal are both modulated according to the minimum positive amplitude level, determining the maximum positive amplitude level by multiplying the minimum positive amplitude value by the amplitude ratio; and
if the first branch signal is modulated according to the maximum positive amplitude level and the second branch signal is modulated according to the minimum positive amplitude level, determining the maximum positive amplitude level based on the first branch signal and determining the minimum positive amplitude level based on the second branch signal.

10. The method of claim 1, further comprising:
determining that the demodulation reference comprises exactly one reference resource element, the one reference resource element comprising a first branch signal and a second branch signal phase-shifted relative to the first branch signal;
determining, according to an amplitude of the first branch signal, a maximum predetermined amplitude level of the modulation scheme; and
determining, according to an amplitude of the second branch signal, a minimum predetermined amplitude level of the modulation scheme.

11. The method of claim 1, further comprising:
receiving, for each reference resource element, a raw reference signal comprising a raw reference signal amplitude and a raw reference signal phase, respectively;
recording, in a calibration set, the raw reference signal amplitudes and the raw reference signal phases;
receiving, for each message element, a raw message signal comprising a raw message signal amplitude and a raw message signal phase, respectively;
determining, for each message element, which raw reference signal amplitude and which raw reference signal phase in the calibration set most closely match the raw message signal amplitude and the raw message signal phase.

12. The method of claim 1, further comprising:
- receiving a first demodulation reference and determining a first set of predetermined amplitude levels therefrom;
- receiving a second demodulation reference and determining a second set of predetermined amplitude levels therefrom;
- then calculating a third set of predetermined amplitude levels by averaging the first and second sets of predetermined amplitude levels.

13. The method of claim 12, further comprising:
- receiving a message element comprising a first branch signal multiplexed with a second branch signal, the first branch signal having a first branch amplitude, and the second branch signal having a second branch amplitude; and
- determining which predetermined amplitude level, of the third set of predetermined amplitude levels, most closely matches the first branch amplitude, and determining which predetermined amplitude level, of the third set of predetermined amplitude levels, most closely matches the second branch amplitude.

14. Non-transitory computer-readable media in a wireless receiver, the media containing instructions that when executed by a computing environment cause a method to be performed, the method comprising:
- receiving a demodulation reference comprising exactly one reference element modulated according to a modulation scheme, the modulation scheme comprising integer Nlevel amplitude levels, the amplitude levels including a minimum positive amplitude level and a maximum positive amplitude level, wherein a predetermined amplitude ratio equals the maximum positive amplitude level divided by the minimum positive amplitude level;
- extracting, from the reference element, a first branch signal having a first branch amplitude, and a second branch signal having a second branch amplitude, the second branch signal phase-shifted relative to the first branch signal; and
- setting the maximum positive amplitude level equal to the first branch amplitude and the minimum positive amplitude level equal to the second branch amplitude.

15. The media of claim 14, the method further comprising:
- calculating zero or more intermediate amplitude levels by interpolating between the maximum positive amplitude level and the minimum positive amplitude level;
- accumulating the maximum positive amplitude level, the minimum positive amplitude level, the zero or more intermediate amplitude levels, and a negative of each listed amplitude level, in a calibration set; and
- demodulating a wireless message according to the calibration set.

16. The media of claim 15, wherein the demodulating comprises:
- for each message element of the wireless message, separating an I-branch signal having an I-branch amplitude and a Q-branch signal having a Q-branch amplitude, the I-branch signal phase-shifted relative to the Q-branch signal; and
- comparing the I-branch amplitude to the amplitude levels in the calibration set and comparing the Q-branch amplitude to the amplitude levels in the calibration set.

17. The media of claim 16, the method further comprising:
- measuring a raw reference amplitude comprising an amplitude of the reference element and a raw reference phase comprising a phase of the reference element;
- calculating zero or more additional raw reference amplitudes according to the predetermined amplitude ratio, and calculating one or more additional raw reference phases according to a predetermined phase step;
- accumulating the raw reference amplitude, the additional raw reference amplitudes, the raw reference phase, and the additional raw reference phases in a second calibration set;
- for each message element, measuring a raw signal amplitude comprising an amplitude of the message element, and measuring a raw signal phase comprising a phase of the message element; and
- for each message element, selecting which of the raw reference amplitudes and raw reference phases in the second calibration set most closely matches the raw signal amplitude and the raw signal phase.

18. The media of claim 17, the method further comprising:
- determining, according to the comparing, a first modulation state of the modulation scheme;
- determining, according to the selecting, a second modulation state of the modulation scheme;
- and determining, if the first and second modulation states are different, that an error has occurred.

19. A wireless communication device configured to:
- receive a demodulation reference modulated according to a modulation scheme, the modulation scheme comprising integer Nlevel predetermined amplitude levels, the demodulation reference comprising exactly two reference resource elements, each reference resource element comprising a first branch signal and a second branch signal phase-shifted relative to the first branch signal;
- determine four reference amplitude values according to the first and second branch signals of the two reference resource elements, respectively; and
- determine the Nlevel amplitude levels according to the four reference amplitude values.

20. The wireless communication device of claim 19, further configured to:
- receive a message comprising message elements, each message element modulated according to the modulation scheme;
- for each message element, measure a first branch amplitude and a second branch amplitude orthogonal to the first branch amplitude; and
- demodulate the message element by comparing the first and second branch amplitudes to the Nlevel amplitude levels.

* * * * *